US012477972B2

(12) United States Patent
Buehler et al.

(10) Patent No.: US 12,477,972 B2
(45) Date of Patent: Nov. 25, 2025

(54) ADJUSTABLE SEED METER AND RELATED SYSTEMS AND METHODS

(71) Applicant: Ag Leader Technology, Ames, IA (US)

(72) Inventors: Brett Buehler, Dallas Center, IA (US); Alex Hartogh, Huxley, IA (US); Scott Eichhorn, Ames, IA (US)

(73) Assignee: Ag Leader Technology, Ames, IA (US)

( * ) Notice: Subject to any disclaimer, the term of this patent is extended or adjusted under 35 U.S.C. 154(b) by 0 days.

(21) Appl. No.: 18/487,824

(22) Filed: Oct. 16, 2023

(65) Prior Publication Data

US 2024/0032455 A1 Feb. 1, 2024

Related U.S. Application Data

(63) Continuation of application No. 16/997,040, filed on Aug. 19, 2020, now Pat. No. 11,785,881.

(60) Provisional application No. 62/888,750, filed on Aug. 19, 2019.

(51) Int. Cl.
*A01C 7/12* (2006.01)
*A01C 7/04* (2006.01)
*A01C 7/10* (2006.01)

(52) U.S. Cl.
CPC ............ *A01C 7/122* (2013.01); *A01C 7/046* (2013.01); *A01C 7/102* (2013.01); *A01C 7/128* (2013.01); *A01C 7/0443* (2023.05)

(58) Field of Classification Search
CPC .................. A01C 7/122; A01C 7/046
See application file for complete search history.

(56) References Cited

U.S. PATENT DOCUMENTS

| 9,439 | A | 12/1852 | Colver |
| 140,493 | A | 7/1873 | Fulghum |
| 540,458 | A | 6/1895 | Robbins |
| 658,348 | A | 9/1900 | Crowley |
| 717,048 | A | 12/1902 | Stirling |
| 1,220,684 | A | 3/1917 | Ray |
| 1,252,923 | A | 1/1918 | Moench |

(Continued)

FOREIGN PATENT DOCUMENTS

| AU | 2018100865 B4 | 6/2022 |
| BR | 102015003633 B1 | 12/2015 |

(Continued)

OTHER PUBLICATIONS

Tempo, Vaderstad, 2017.

(Continued)

*Primary Examiner* — Alicia Torres
(74) *Attorney, Agent, or Firm* — DENTONS DAVIS BROWN PC; Matthew Warner-Blankenship; Kassandra Ricklefs

(57) ABSTRACT

Adjustable seed meters having a first seed disk having first openings defined therein and a second seed disk having second openings defined therein adjacent to the first openings such that the first and second openings are alignable to form adjustable seed cells. Various embodiments have a plate adjustment drive system to rotate the first and second seed disks in relation to each other. Other embodiments relate to methods of automatically adjusting a seed meter during operation of the overall planting system.

17 Claims, 12 Drawing Sheets

(56) References Cited

U.S. PATENT DOCUMENTS

| | | | |
|---|---|---|---|
| 1,264,454 A | 4/1918 | Terrell |
| 1,376,933 A | 5/1921 | Gould, Jr. |
| 1,397,689 A | 11/1921 | Krotz |
| 1,566,187 A | 12/1925 | Fifer |
| 1,997,791 A | 4/1935 | Hoberg |
| 2,053,390 A | 9/1936 | Bateman |
| 2,054,552 A | 9/1936 | Wakeham |
| 2,141,044 A | 12/1938 | Rassmann |
| 2,340,163 A | 1/1944 | White |
| 2,440,846 A | 5/1948 | Cannon |
| 2,510,658 A | 6/1950 | Rassmann |
| 2,525,435 A | 10/1950 | White |
| 2,566,406 A | 9/1951 | Dougherty |
| 2,589,762 A | 3/1952 | Barnett |
| 2,673,536 A | 3/1954 | Skinner |
| 2,913,086 A | 11/1959 | Wade |
| 2,975,936 A | 3/1961 | Rousek |
| 2,980,043 A | 4/1961 | Beck |
| 3,077,290 A | 2/1963 | Rehder |
| 3,122,283 A | 2/1964 | Walters |
| 3,176,636 A | 4/1965 | Wilcox et al. |
| 3,253,739 A | 5/1966 | Martin |
| 3,272,159 A | 9/1966 | Sanderson |
| 3,325,060 A | 6/1967 | Rehder |
| 3,343,507 A | 9/1967 | Smith |
| 3,413,941 A | 12/1968 | Roberson |
| 3,693,833 A | 9/1972 | Weitz |
| 3,796,346 A | 3/1974 | Ribouleau |
| 3,797,418 A | 3/1974 | Bridger |
| 3,913,503 A | 10/1975 | Becker |
| 3,990,606 A | 11/1976 | Gugenhan |
| 4,002,266 A | 1/1977 | Beebe |
| 4,023,509 A | 5/1977 | Hanson |
| 4,026,437 A | 5/1977 | Biddle |
| 4,029,235 A | 6/1977 | Grataloup |
| 4,037,755 A | 7/1977 | Yeuter |
| 4,193,523 A | 3/1980 | Koning |
| 4,209,109 A | 6/1980 | Curl |
| 4,282,985 A | 8/1981 | Yamamoto |
| 4,324,347 A | 4/1982 | Thomas |
| 4,333,561 A | 6/1982 | Schlegel |
| 4,449,642 A | 5/1984 | Dooley |
| 4,600,122 A | 7/1986 | Lundie et al. |
| 4,613,056 A | 9/1986 | Olson |
| 4,653,410 A | 3/1987 | Typpi |
| 4,793,511 A | 12/1988 | Ankum |
| 4,899,672 A | 2/1990 | Paul |
| 4,949,869 A | 8/1990 | Ribouleau |
| 5,058,766 A | 10/1991 | Deckler |
| 5,161,472 A | 11/1992 | Handy |
| 5,170,909 A | 12/1992 | Lundie et al. |
| 5,333,559 A | 8/1994 | Hodapp |
| 5,501,366 A * | 3/1996 | Fiorido ................. A01C 7/046 221/211 |
| 5,601,209 A | 2/1997 | Barsi |
| 5,664,507 A | 9/1997 | Bergland et al. |
| 5,697,308 A | 12/1997 | Rowlett |
| 5,720,233 A | 2/1998 | Lodico |
| 5,740,747 A | 4/1998 | Stufflebeam |
| 5,765,720 A | 6/1998 | Stufflebeam |
| 5,799,598 A | 9/1998 | Stufflebeam |
| 5,848,571 A | 12/1998 | Stufflebeam |
| 5,915,313 A | 6/1999 | Bender |
| 5,936,234 A | 8/1999 | Thomas et al. |
| 5,975,283 A | 11/1999 | Riffe |
| 6,142,086 A | 11/2000 | Richard |
| 6,260,632 B1 | 7/2001 | Bourgault et al. |
| 6,269,758 B1 | 8/2001 | Sauder |
| 6,293,438 B1 | 9/2001 | Woodruff |
| 6,352,042 B1 | 3/2002 | Martin |
| 6,516,733 B1 | 2/2003 | Sauder |
| 6,640,731 B1 | 11/2003 | Rowlett |
| 6,651,570 B1 | 11/2003 | Thiemke |
| 6,681,706 B2 | 1/2004 | Sauder |
| 6,718,892 B1 | 4/2004 | Rosenboom |
| 6,748,885 B2 | 6/2004 | Sauder |
| 6,752,095 B1 | 6/2004 | Rylander et al. |
| 7,131,384 B2 | 11/2006 | Kester |
| 7,263,937 B2 | 9/2007 | Frasier |
| 7,334,532 B2 | 2/2008 | Sauder et al. |
| 7,404,366 B2 | 7/2008 | Mariman |
| 7,448,334 B2 | 11/2008 | Mariman |
| 7,490,565 B2 | 2/2009 | Holly |
| 7,581,684 B2 | 9/2009 | des Garennes et al. |
| 7,584,707 B2 | 9/2009 | Sauder et al. |
| 7,661,377 B2 | 2/2010 | Keaton |
| 7,854,206 B2 | 12/2010 | Horsch |
| 7,918,168 B2 | 4/2011 | Garner |
| 8,074,586 B2 | 12/2011 | Garner |
| 8,276,529 B2 | 10/2012 | Garner |
| 8,322,293 B2 | 12/2012 | Wollenhaupt et al. |
| 8,336,471 B2 | 12/2012 | Gilstring |
| 8,375,873 B2 | 2/2013 | Nelson et al. |
| 8,375,874 B2 | 2/2013 | Peterson |
| 8,443,742 B2 | 5/2013 | Orrenius |
| 8,448,585 B2 | 5/2013 | Wilhelmi et al. |
| 8,468,960 B2 | 6/2013 | Garner |
| 8,522,699 B2 | 9/2013 | Garner |
| 8,671,856 B2 | 3/2014 | Garner et al. |
| 8,677,914 B2 | 3/2014 | Stark |
| 8,746,159 B2 | 6/2014 | Garner et al. |
| 8,789,482 B2 | 7/2014 | Garner |
| 8,789,483 B2 | 7/2014 | Gilstring |
| 8,800,457 B2 | 8/2014 | Garner |
| 8,813,663 B2 | 8/2014 | Garner |
| 8,850,995 B2 | 10/2014 | Garner |
| 8,850,998 B2 | 10/2014 | Garner et al. |
| 8,903,545 B2 | 12/2014 | Riffel |
| 8,942,896 B2 | 1/2015 | Mayerle |
| 8,978,564 B2 | 3/2015 | Hagny |
| 8,985,037 B2 | 3/2015 | Radtke |
| 9,119,342 B2 | 9/2015 | Bonefas |
| 9,137,941 B2 | 9/2015 | Stark |
| 9,148,992 B2 | 10/2015 | Staeter |
| 9,151,388 B2 | 10/2015 | Gilstring |
| 9,265,191 B2 | 2/2016 | Sauder |
| 9,277,688 B2 | 3/2016 | Wilhelmi |
| 9,282,691 B2 | 3/2016 | Wilhelmi |
| 9,282,692 B2 | 3/2016 | Wilhelmi |
| 9,313,941 B2 | 4/2016 | Garner |
| 9,313,942 B2 | 4/2016 | Wilhelmi |
| 9,332,689 B2 | 5/2016 | Baurer et al. |
| 9,345,188 B2 | 5/2016 | Garner |
| 9,351,440 B2 | 5/2016 | Sauder |
| 9,426,940 B2 | 8/2016 | Connors et al. |
| 9,433,141 B2 | 9/2016 | Friestad |
| 9,480,199 B2 | 11/2016 | Garner |
| 9,491,901 B2 | 11/2016 | Gentili |
| 9,510,502 B2 | 12/2016 | Garner et al. |
| 9,578,802 B2 | 2/2017 | Radtke |
| 9,603,298 B2 | 3/2017 | Wendte et al. |
| 9,622,402 B2 | 4/2017 | Kinzenbaw et al. |
| 9,629,301 B2 | 4/2017 | Gentili |
| 9,629,302 B2 | 4/2017 | Gentili |
| 9,661,799 B2 | 5/2017 | Garner |
| 9,668,402 B2 | 6/2017 | Hagny |
| 9,675,002 B2 | 6/2017 | Roszman |
| 9,686,906 B2 | 6/2017 | Garner et al. |
| 9,693,498 B2 | 7/2017 | Zumdome |
| 9,699,955 B2 | 7/2017 | Garner |
| 9,706,702 B2 | 7/2017 | Wendte et al. |
| 9,730,379 B2 | 8/2017 | Wendte |
| 9,733,634 B2 | 8/2017 | Prickel |
| 9,756,779 B2 | 9/2017 | Wilhelmi et al. |
| 9,769,978 B2 | 9/2017 | Radtke |
| 9,807,921 B2 | 11/2017 | Levy et al. |
| 9,807,922 B2 | 11/2017 | Garner |
| 9,807,924 B2 | 11/2017 | Garner et al. |
| 9,814,176 B2 | 11/2017 | Kowalchuk |
| 9,820,427 B2 | 11/2017 | Hagny |
| 9,820,429 B2 | 11/2017 | Garner |
| 9,832,924 B2 | 12/2017 | Anderson |
| 9,861,025 B2 | 1/2018 | Schaefer et al. |
| 9,861,031 B2 | 1/2018 | Garner |

(56) References Cited

U.S. PATENT DOCUMENTS

| | | | |
|---|---|---|---|
| 9,872,424 B2 | 1/2018 | Baurer et al. | |
| 9,936,627 B2 | 4/2018 | Wilhelmi et al. | |
| 9,936,628 B2 | 4/2018 | Wilhelmi et al. | |
| 9,949,426 B2 | 4/2018 | Radtke | |
| 9,980,426 B2 | 5/2018 | Wilhelmi et al. | |
| 10,004,173 B2 | 6/2018 | Garner | |
| 10,010,024 B2 | 7/2018 | Pirkenseer et al. | |
| 10,051,782 B2 | 8/2018 | Wilhelmi et al. | |
| 10,104,832 B2 | 10/2018 | Wilhelmi et al. | |
| 10,154,623 B2 | 12/2018 | Wilhelmi et al. | |
| 10,206,326 B2 | 2/2019 | Garner | |
| 10,257,973 B2 | 4/2019 | Hubner et al. | |
| 10,299,425 B2 | 5/2019 | Sauder et al. | |
| 10,398,077 B2 | 9/2019 | Radtke | |
| 10,470,358 B2 | 11/2019 | Sauder et al. | |
| 10,485,159 B2 | 11/2019 | Wilhelmi et al. | |
| 10,609,857 B2 | 4/2020 | Sauder et al. | |
| 10,729,063 B2 | 8/2020 | Garner | |
| 10,743,460 B2 | 8/2020 | Gilbert | |
| 10,806,070 B2 | 10/2020 | Garner et al. | |
| RE48,572 E | 6/2021 | Garner | |
| 11,051,445 B2 | 7/2021 | Hubner | |
| 11,058,048 B2 | 7/2021 | Radtke | |
| 11,144,775 B2 | 10/2021 | Ferrari et al. | |
| 11,202,404 B2 | 12/2021 | Walter et al. | |
| 11,277,961 B2 | 3/2022 | Campbell | |
| 11,523,554 B2 | 12/2022 | Buehler | |
| 11,730,079 B2 | 8/2023 | Wilhelmi | |
| 11,785,881 B2 * | 10/2023 | Buehler | A01C 7/046 |
| | | | 111/184 |
| 11,818,977 B2 | 11/2023 | Anderson | |
| 11,877,530 B2 | 1/2024 | Barry | |
| 11,997,939 B2 | 6/2024 | Gilbert | |
| 2005/0103244 A1 | 5/2005 | Mayerle | |
| 2010/0224110 A1 | 9/2010 | Mariman | |
| 2011/0028214 A1 | 2/2011 | Bright et al. | |
| 2011/0162566 A1 | 7/2011 | Willhelmi et al. | |
| 2011/0271887 A1 | 11/2011 | Shoup | |
| 2014/0033972 A1 * | 2/2014 | Meyer | A01C 1/06 |
| | | | 118/500 |
| 2014/0277959 A1 | 9/2014 | Wagers | |
| 2015/0223391 A1 | 8/2015 | Wendte | |
| 2015/0223392 A1 | 8/2015 | Wilhelmi et al. | |
| 2015/0289441 A1 | 10/2015 | Arnett | |
| 2015/0289442 A1 * | 10/2015 | Heilman | A01D 41/12 |
| | | | 111/184 |
| 2015/0305229 A1 | 10/2015 | Sauder | |
| 2015/0319919 A1 | 11/2015 | Sauder | |
| 2015/0351315 A1 | 12/2015 | Wendte | |
| 2016/0128269 A1 | 5/2016 | Helmick | |
| 2016/0212932 A1 | 7/2016 | Radtke | |
| 2016/0227700 A1 | 8/2016 | Wendte et al. | |
| 2016/0249525 A1 | 9/2016 | Baurer et al. | |
| 2017/0020058 A1 | 1/2017 | Pirkenseer et al. | |
| 2017/0034995 A1 | 2/2017 | Wilhelmi | |
| 2017/0127604 A1 | 5/2017 | Wilhelmi | |
| 2017/0223947 A1 | 8/2017 | Gall et al. | |
| 2017/0332546 A1 | 11/2017 | Garner et al. | |
| 2017/0359949 A1 | 12/2017 | Garner et al. | |
| 2017/0367255 A1 | 12/2017 | Wilhelmi et al. | |
| 2018/0007824 A1 | 1/2018 | Radtke | |
| 2018/0249624 A1 | 9/2018 | Gentili | |
| 2020/0053954 A1 | 2/2020 | Hamilton | |
| 2020/0352088 A1 | 11/2020 | Arnett et al. | |
| 2021/0037699 A1 | 2/2021 | Wilhelmi | |
| 2021/0185903 A1 | 6/2021 | Demiter | |
| 2021/0212252 A1 | 7/2021 | Wilhelmi | |
| 2021/0307236 A1 | 10/2021 | Strnad et al. | |
| 2022/0000008 A1 | 1/2022 | Hubner et al. | |
| 2022/0061208 A1 | 3/2022 | Campbell | |
| 2022/0142041 A1 | 5/2022 | Johnson | |
| 2022/0192080 A1 | 6/2022 | Goza | |
| 2022/0232753 A1 | 7/2022 | Van De Woestyne et al. | |
| 2023/0105245 A1 | 4/2023 | Buehler | |
| 2023/0180653 A1 | 6/2023 | Barry | |
| 2023/0232732 A1 | 7/2023 | Hartogh | |
| 2023/0413720 A1 | 12/2023 | Barry | |
| 2024/0032455 A1 | 2/2024 | Buehler | |
| 2024/0040955 A1 | 2/2024 | Barry | |
| 2024/0315163 A1 | 9/2024 | Gilbert | |

FOREIGN PATENT DOCUMENTS

| | | | | |
|---|---|---|---|---|
| BR | 102016002919 B1 | 8/2016 | | |
| CA | 1218266 A | 2/1987 | | |
| CA | 2408684 A1 | 12/2001 | | |
| CA | 2213350 C | 7/2002 | | |
| CA | 2213354 C | 7/2002 | | |
| CA | 2213703 C | 7/2002 | | |
| CA | 2830627 C | 9/2012 | | |
| CA | 2915844 C | 12/2015 | | |
| CA | 2923713 A1 | 12/2016 | | |
| CN | 201057704 Y | 5/2008 | | |
| CN | 206380282 U | * | 8/2017 | |
| CN | 109463081 A | * | 3/2019 | A01C 7/20 |
| CN | 112601450 A | 4/2021 | | |
| DE | 389840 C | 2/1924 | | |
| DE | 2011462 A1 | 9/1971 | | |
| DE | 2826658 A1 | 4/1981 | | |
| DE | 8400142 U1 | 5/1984 | | |
| DE | 3405031 C1 | 4/1985 | | |
| DE | 3826397 A1 | 1/1989 | | |
| DE | 102017118594 | 2/2019 | | |
| DE | 102017118594 A1 | * | 2/2019 | |
| EP | 47577 A3 | 3/1982 | | |
| EP | 152048 A2 | 8/1985 | | |
| EP | 182220 B1 | 5/1986 | | |
| EP | 606541 A1 | 7/1994 | | |
| EP | 1461989 A1 | 9/2004 | | |
| EP | 2832203 B1 | 2/2015 | | |
| EP | 2911497 B1 | 10/2016 | | |
| EP | 2911499 B1 | 10/2016 | | |
| EP | 3108731 A8 | 12/2016 | | |
| EP | 2688384 B1 | 6/2017 | | |
| EP | 3219186 A1 | 9/2017 | | |
| EP | 2901838 B1 | 11/2017 | | |
| EP | 3753388 A2 | * | 12/2020 | A01C 7/046 |
| FR | 1229027 A | 9/1960 | | |
| FR | 1503687 A | 12/1967 | | |
| FR | 2414288 A1 | 8/1979 | | |
| FR | 2490064 A1 | 3/1982 | | |
| FR | 2591061 A1 | 6/1986 | | |
| FR | 2574243 A1 | 6/1987 | | |
| FR | 2678472 A1 | * | 1/1993 | A01C 7/046 |
| GB | 18381 A | 10/1904 | | |
| GB | 482789 A | 4/1938 | | |
| GB | 989145 A | 4/1965 | | |
| GB | 1136771 A | 12/1968 | | |
| GB | 2057835 A | 4/1981 | | |
| GB | 2012534 A | 1/1982 | | |
| JP | S56-24815 U | 3/1981 | | |
| JP | H11-59886 A | 3/1999 | | |
| JP | 2007117941 A | 5/2007 | | |
| NL | 1005451 C2 | 9/1998 | | |
| SU | 948316 A1 | 8/1982 | | |
| WO | 9716954 A1 | 5/1997 | | |
| WO | 1998/049884 A1 | 11/1998 | | |
| WO | 2005/011358 A1 | 2/2005 | | |
| WO | 2010/059101 A1 | 5/2010 | | |
| WO | 2010/124360 A1 | 11/2010 | | |
| WO | 2013/130003 A1 | 9/2013 | | |
| WO | 2021021594 A1 | 2/2021 | | |

OTHER PUBLICATIONS

Fundamentals of Machine Operation—Planting, Deere & Co. (Breece et al 1975).

John Deere 7000 and 7100 MaxEmerge Planting Unit, parts catalog.

Manual for Deere 495 and 695 planters.

Monosem NG Plus seed meter; 1994 Monosem manual.

Fundamentals of Machine Operation—Planting, Deere & Co. (Breece et al 1981).

John Deere Planter Models 71 Flexi, 495A, 695A.

(56) References Cited

OTHER PUBLICATIONS

John Deere Operators Manual 694A, 695A, and 894A Corn Planters (OMB25391 E7).
John Deere 494-A and 495-A Four-row Corn Planters (A1477-62-12-Pltr. (Litho in USA)).
Kinze Promotion Video True Speed—3D with Ultra Slow Motion.
Kinze Promotional Brochure "High Speed Planting Solution True Speed".
Ag leader Promotional Video "Ag Leader SureSpeed".
Ag Leader Promotional Video "Ag Leader SureSpeed Unveiling".
Kinze Promotional video "an in-depth look into kinze's true speed".
Salte et al. Nov. 12, 1997 CZ203397A3 (Year: 1997).

\* cited by examiner

ADJUSTABLE SEED METER AND RELATED SYSTEMS AND METHODS

CROSS-REFERENCE TO RELATED APPLICATION(S)

This application is a continuation of U.S. application Ser. No. 16/997,040, filed Aug. 19, 2020 which claims the benefit under 35 U.S.C. § 119(e) to U.S. Provisional Application 62/888,750, filed Aug. 19, 2019 and entitled "Adjustable Seed Meter and Related Systems and Methods," which is hereby incorporated herein by reference in its entirety.

FIELD

The disclosed technology relates generally to devices, systems and methods for use in planting, and in particular, to the devices, methods, and design principles relating to an adjustable seed meter allowing for automatic in-field adjustment of seed cell position, geometry, and/or number in both normal and high-speed planting implementations. This has implications for high speed, high yield planting of corn, beans and other agricultural crops.

BACKGROUND

As agricultural planting technologies continues to improve, precision agriculture is fast becoming the industry standard. "Precision agriculture," which has been enabled by global positioning system and global navigation satellite system technologies, relates to the ability to control crop input location and variability on a precise, site-specific basis across one or more fields in such a manner as to optimize the return on the inputs while minimizing costs.

Most known vacuum planters provide solely manual adjustment mechanisms for improving seed singulation quality, and often just one or two such mechanisms. One known mechanism is an adjustable singulator on each planting row unit that can be manually moved either towards or away from the line of seed cells on a seed disk, thereby impacting the ability of the singulator to knock extra seeds from each cell. The closer the singulator is to the row of seed cells, the more likely that not only the extra seeds are knocked from the cell, but all seeds, thereby resulting in skips (cells that contain no seeds). Alternatively, the farther away the singulator is from the row of seed cells, the more likely that extra seeds will not be knocked from the cell, thereby resulting in doubles (cells containing at least two seeds). The known adjustable singulator mechanism typically requires the operator to stop the tractor and planting system, physically dismount from the tractor, approach the planting system, and physically adjust each individual singulator that the operator has identified as a potential for improvement. Another known mechanism is a mechanism for adjusting vacuum intensity. Such a mechanism affects all rows attached to the vacuum fan being adjusted.

With respect to both known manual mechanisms described above, a skilled operator is required to identify that a singulation problem exists and is recurring. Further, the operator must also understand what to adjust and in which direction in order to reduce or eliminate the problem.

There is a need in the art for improved seed singulation adjustment systems, methods, and devices for in-field adjustment during a planting operation, including for use in high-speed planting systems.

BRIEF SUMMARY

Discussed herein are various adjustable seed meter systems that can operate in any type of planting system, including high-speed planting systems, to quickly and easily adjust the seed cell position, geometry, and/or number of the seed meter seed cells in real-time, including in the middle of the field without having to stop.

In Example 1, an automatically adjustable seed metering system comprises a metering housing, a first seed disk rotatably disposed within the metering housing, the first seed disk comprising first openings defined in the first seed disk, and a second seed disk rotatably disposed within the metering housing adjacent to and rotatable in relation to the first seed disk, the second seed disk comprising second openings defined in the second seed disk adjacent to the first openings, and a seed chamber defined between a first wall of the metering housing and the first seed disk. In addition, the second openings are rotatably and adjustably alignable with the first openings, wherein a rotational axis of the second seed disk is concentric with a rotational axis of the first seed disk.

Example 2 relates to the seed metering system according to Example 1, wherein each of the first openings is a slot disposed at an angle in relation to a radius of the first seed disk, and wherein each of the second openings is smaller than each of the first openings and is in fluidic communication with one of the first openings, whereby each pair of first and second openings defines an adjustable seed cell.

Example 3 relates to the seed metering system according to Example 1, wherein each of the first openings is an elongate opening having a first end having a curved configuration and a second end that is wider than the first end such that the elongate opening increases in width along a length from the first end to the second end, and wherein each of the second openings is smaller than each of the first openings and is in fluidic communication with one of the first openings, wherein each of the second openings has a curved end opposing the curved first end, whereby each pair of first and second openings defines an adjustable ovular seed cell.

Example 4 relates to the seed metering system according to Example 1, wherein the first openings comprise a first row of first openings and a second row of first openings, wherein the second openings comprise a first row of second openings adjacent to the first row of first openings and a second row of second openings adjacent to the second row of first openings, whereby the first row of first openings and the first row of second openings define a first row of adjustable seed cells and the second row of first openings and the second row of second openings define a second row of adjustable seed cells.

Example 5 relates to the seed metering system according to Example 4, wherein the first row of first openings is an inner row of first openings, the second row of first openings is an outer row of first openings, the first row of second openings is an inner row of second openings, and the second row of second openings is an outer row of second openings.

Example 6 relates to the seed metering system according to Example 5, wherein the second row of first openings comprise first openings of different diameters.

Example 7 relates to the seed metering system according to Example 6, wherein the second row of first openings comprises a first set of second openings of a first diameter and a second set of second openings of a second diameter, wherein the first diameter is larger than the second diameter.

Example 8 relates to the seed metering system according to Example 1, further comprising a plate adjustment drive system operably coupled to the first and second seed plates, and a meter drive system operably coupled to at least one of the first and second seed plates.

In Example 9, an automatically adjustable seed metering system comprises a metering housing, a first seed disk rotatably disposed within the metering housing, the first seed disk comprising at least one first disk curved row of first disk openings defined in the first seed disk, a second seed disk rotatably disposed within the metering housing adjacent to and rotatable in relation to the first seed disk, a seed chamber defined between a first wall of the metering housing and the first seed disk, a plate adjustment drive system operably coupled to the first and second seed plates, and a meter drive system operably coupled to at least one of the first and second seed plates. Further, the second seed disk comprises at least one second disk curved row of second disk openings defined in the second seed disk adjacent to one of the at least one first disk curved rows, wherein the second disk openings are rotatably and adjustably alignable with the first disk openings, wherein a rotational axis of the second seed disk is concentric with a rotational axis of the first seed disk.

Example 10 relates to the seed metering system according to Example 9, wherein the plate adjustment drive system comprises a first cylinder operably coupled to the first seed plate, a second cylinder rotatably disposed within the first cylinder and operably coupled to the second seed plate, and a translational elongate structure slidable along an axis parallel with the rotational axes of the first and second seed disks, wherein the translational elongate structure is operably coupled to the first and second cylinders such that translational movement of the translational elongate structure causes rotation of the first and second cylinders.

Example 11 relates to the seed metering system according to Example 10, wherein the translational elongate structure is slidably disposed within the second cylinder.

Example 12 relates to the seed metering system according to Example 11, wherein the first cylinder comprises at least one first slot defined within the first cylinder and the second cylinder comprises at least one second slot defined within the second cylinder, wherein the at least one second slot is disposed at an angle in relation to the at least one first slot.

Example 13 relates to the seed metering system according to Example 12, wherein the translational elongate structure comprises a transverse pin operably coupled to the translational elongate structure, wherein the transverse pin is slidably disposed through the at least one first slot and the at least one second slot.

Example 14 relates to the seed metering system according to Example 9, wherein the translational elongate structure is operably coupled to an actuator.

Example 15 relates to the seed metering system according to Example 14, further comprising a drive wheel coupled to the translational elongate structure via a rotational pin attached to the drive wheel, wherein the rotational pin is slidably disposed within a slot defined in the translational elongate structure.

In Example 16, a method of automatically adjusting a seed meter during operation of a planting system comprises rotating a first seed disk and a second seed disk at the same speed to plant seeds with the planting system in a field and automatically rotating the first seed disk in relation to the second seed disk in the field without manual adjustment. The first seed disk comprises at least one first disk curved row of a plurality of first disk openings defined in the first seed disk, and the second seed disk comprises at least one second disk curved row of a plurality of second disk openings defined in the second seed disk adjacent to one of the at least one first disk curved rows, wherein the plurality of second disk openings are rotatably and adjustably alignable with the plurality of first disk openings to form a plurality of seed cells, and whereby a size, position, number, or shape of the plurality of seed cells is adjusted as a result of the rotating of the first seed disk in relation to the second seed disk.

Example 17 relates to the method according to Example 16, wherein the automatically rotating the first seed disk in relation to the second seed disk comprises actuating a plate adjustment drive system operably coupled to the first and second seed plates.

Example 18 relates to the method according to Example 17, wherein the rotating the first seed disk and the second seed at the same speed comprises actuating a meter drive system operably coupled to at least one of the first and second seed plates.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various embodiments herein relate to seed meter devices that include an adjustable seed meter that allows for manual, automatic, and/or real-time adjustment of the seed cell position, geometry, or number during planting. It is understood that the various adjustable seed meter system implementations disclosed or contemplated herein can be incorporated into any known planting or seeding machine, such as, but not limited to, row crop planters, grain drills, air seeders, etc.

Figure 1A:
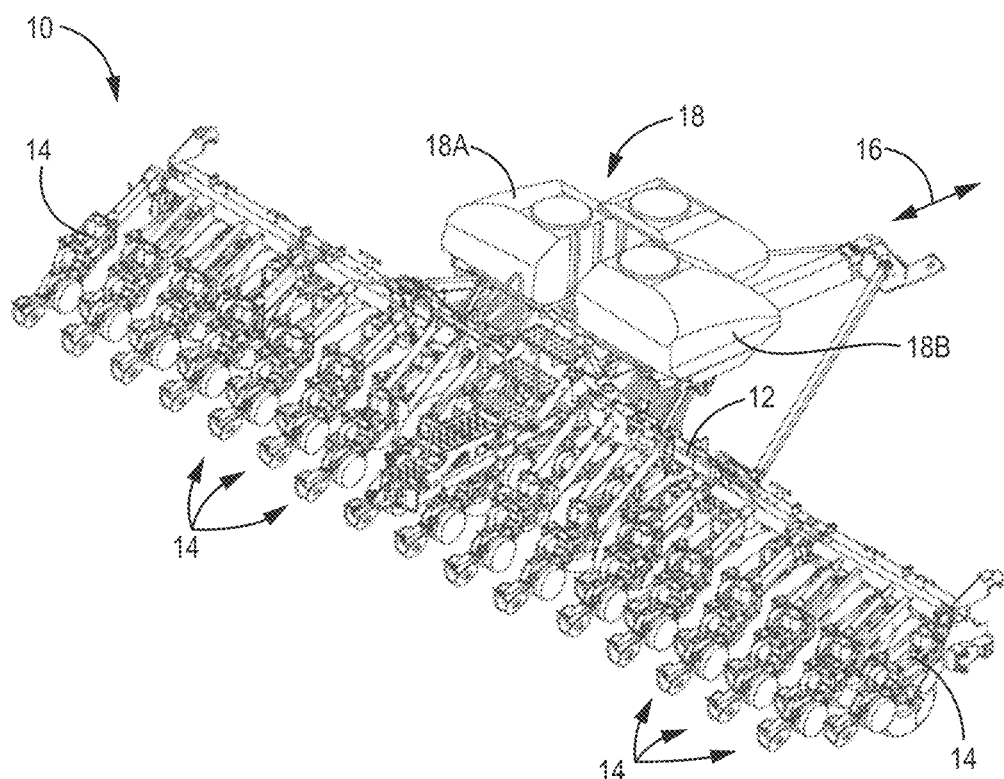
FIG. 1A is a perspective view of a planting system, according to one embodiment.

FIG. 1A depicts an exemplary planter or seeding machine 10 that, according to one embodiment, can have an adjustable seed metering system as disclosed or contemplated herein. The planting machine 10 in this specific implementation is a row crop planter 10 having a central crossbar 12 and multiple planting row units 14 mounted to the crossbar 12. At least two hoppers (also referred to herein as "storage tanks") 18A, 18B on the seeding machine 10 are fluidically coupled to unit hoppers (also referred to as "mini-hoppers") (such as hopper 34 as discussed below) on each planting unit 14 such that seed can be delivered pneumatically from one of the hoppers 18 to a unit hopper (such as hopper 34) on each unit 14. Alternatively, any known hopper or seed retention device configuration can be incorporated into the planter 10 and the separate units 14 and function with the adjustable seed metering system embodiments herein. It is understood that, generally, the row units 14 on a particular planter (such as exemplary planter 10) are typically identical or substantially similar. The seeding machine 10 moves forward and backward via the fore-aft direction shown by the arrow 16.

Figure 1B:
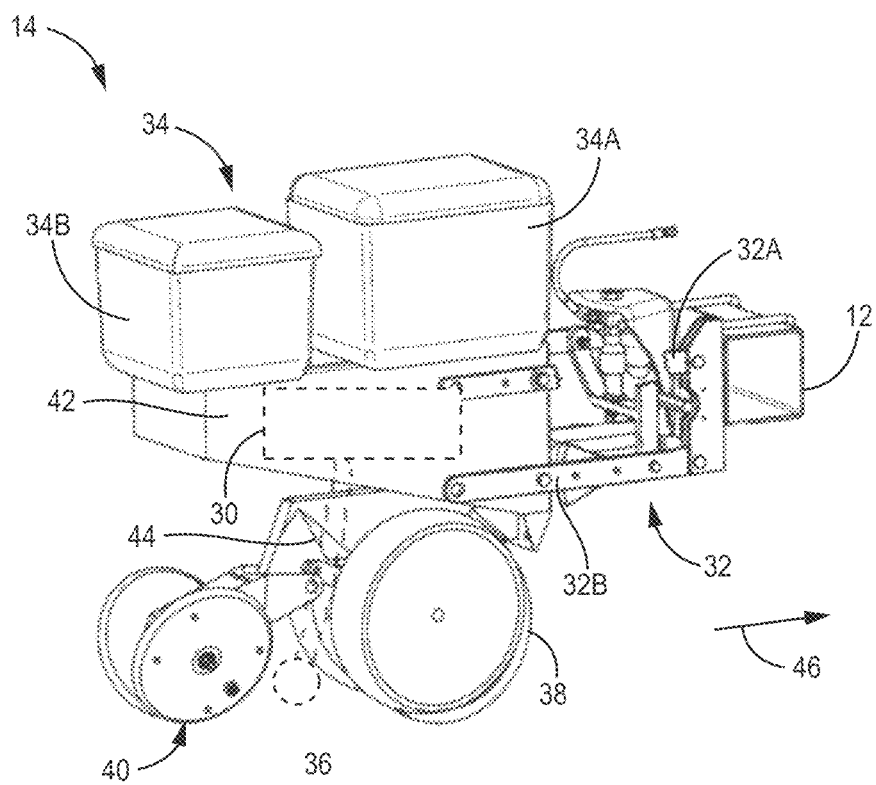
FIG. 1B is a perspective view of a row unit, according to one embodiment.

One example of a row unit 14 having an adjustable seed metering system 30, according to one embodiment, is depicted in greater detail in FIG. 1B. It is understood that any adjustable seed metering system according to any embodiment disclosed or contemplated herein (such as system 30) can be incorporated into any known row unit having any configuration, and that any such row unit 14 can be incorporated into any known seeding machine. This particular exemplary row unit 14 is jointedly coupled to the central crossbar 12 via a parallelogram linkage 32 made up of two linkage arms 32A, 32B such that the individual units 14 are vertically moveable by a predetermined amount relative to the crossbar 12. The exemplary row unit 14 in this implementation has known components, including a hopper 34, gauge wheels 36 (controlling the depth of the furrow), furrow opening disks 38 (to form an open furrow in the soil beneath the seeding machine into which seed is deposited), and a closing and packing wheel 40 (to close the furrow over the deposited seed and to firm the soil in the closed furrow), as are generally understood in the art. Alternatively, any known components or features can be incorporated into the row units 14. According to certain embodiments, the hopper 34 is made up of at least two hoppers 34A, 34B. For example, in one implementation, the hopper 34 is made up of two seed hoppers 34A and a chemical hopper 34B, such that each of the two seed hoppers 34A contain a different type of seed and the chemical hopper 34B can contain a herbicide, insecticide, or any other known chemical for application while planting, including any combination thereof. In this implementation, the seed metering system 30 is disposed on the row unit 14, and more specifically, coupled to the frame member 42 thereof, such that it can be in operable communication with the hopper 34 and the seed delivery system 44. The frame member 42 is jointedly coupled to the parallelogram linkage 32. Seed is stored or retained in seed hopper 34 and provided to the seed meter 30. From the adjustable seed meter system 30, the seed is carried by the delivery system 44 into a planting furrow, or trench, formed in the soil by furrow openers 38. It is understood that the adjustable seed metering system embodiments as disclosed or contemplated herein (including system 30) can be coupled to and operate with any known seed delivery system. The crossbar 12 and row unit 14 are designed to be moved over the ground in a forward working direction identified by arrow 46.

Figure 2A:
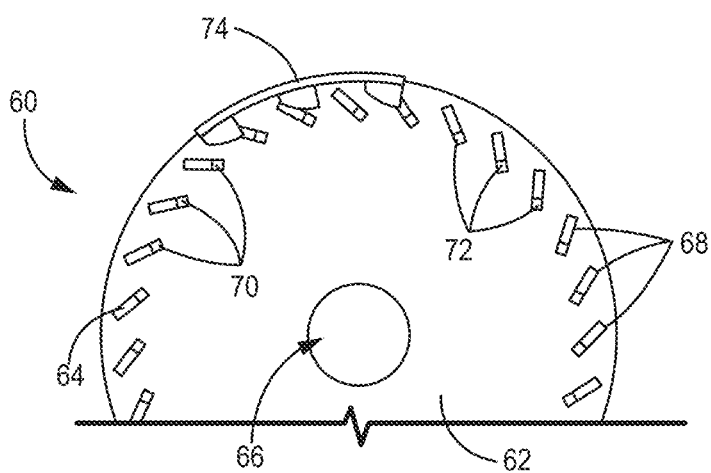
FIG. 2A is a side view of first and second seed plates in a first position, according to one embodiment.
Figure 2B:
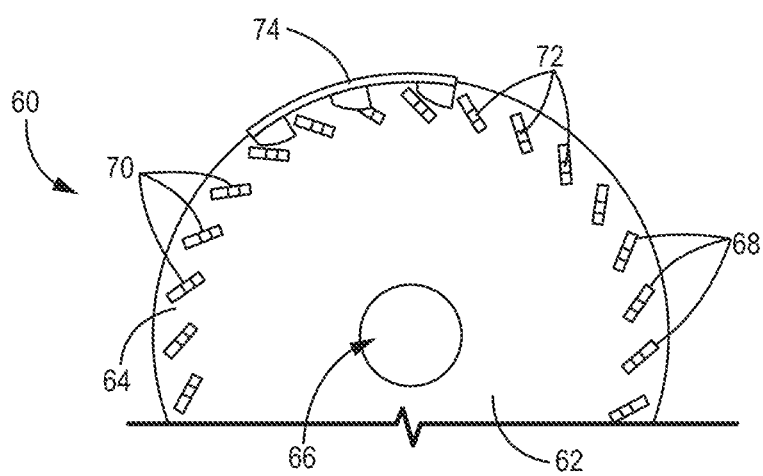
FIG. 2B is a side view of the first and second seed plates of FIG. 2A in a second position, according to one embodiment.
Figure 2C:
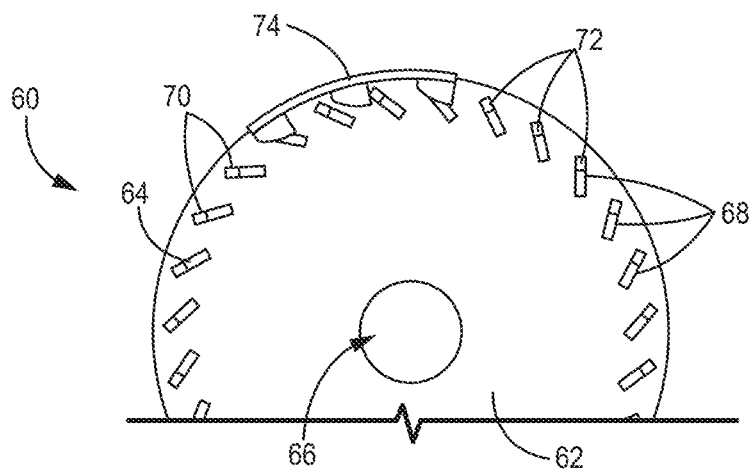
FIG. 2C is a side view of the first and second seed plates of FIG. 2A in a third position, according to one embodiment.

One exemplary adjustable seed meter system embodiment 60 is shown in FIGS. 2A-2C. In this implementation, the two seed plates 62, 64 operate together as described below to provide an adjustable cell position. More specifically, FIGS. 2A-2C focus entirely on the two seed plates 62, 64 of the system 60 to best explain the rotational relationship between the two plates 62, 64, while the remaining components of such a system will be shown in subsequent embodiments as discussed below. The two plates 62, 64 are positioned in substantial contact with each other such that the two plates 62, 64 can rotate in relation to each other around the same axis. That is, the two plates 62, 64 are coaxial and rotate around a central axis identified generally at 66. The figures depict a front view of the first plate 62 disposed in contact with the second plate 64 such that most of the first plate 62 is visible while most of the second plate 64 is not. More specifically, as a result of the viewpoint of FIGS. 2A-2C, the only portions of the second plate 64 that are visible are the portions that are visible through the openings 68 (as discussed below) in the first plate 62. Each plate 62, 64 has a set of corresponding openings defined around an outer radial portion of the plates 62, 64, such that the plate 62 has a set of angled openings 68 and the plate 64 has a set of openings 70 that align with the openings 68 of the plate 62, such that each of the corresponding openings 68, 70 form an adjustable cell 72 having an adjustable position as shown.

In operation, the two plates 62, 64 can be rotated in relation to each other to adjust the radial position of the cells 72 in relation to the central axis 66 of the plates 62, 64 and also in relation to the standard singulator 74 that is disposed adjacent to the first plate 62 as shown. For example, in FIG. 2A, the plates 62, 64 are positioned such that the cells 72 are disposed at a first position (also referred to as the "least aggressive" or "distant" position) in which the cells 72 are relatively closer to the central axis 66 and thus farther away from the singulator 74 than any other cell position. Further, in FIG. 2B, one plate 62, 64 is rotated or both plates 62, 64 are rotated in relation to each other such that the cells 72 are disposed at a midpoint position in which the cells 72 are disposed at a second position, which is a midpoint between the first position described above and the third position described below. Finally, in FIG. 2C, one plate 62, 64 is rotated or both plates 62, 64 are rotated in relation to each other such that the cells are disposed at a third position (also referred to as the "most aggressive" or "closest" position) in which the cells 72 are relatively further away from the central axis 66 and thus closer to the singulator 74 than any other cell position. In one embodiment, the cells 72 can be moved from the first position to the second and third positions by rotating the plate 62 clockwise. Alternatively, the cells 72 can be moved from the first to the second and third positions by rotating the plate 64 counterclockwise. In a further alternative, the cells 72 can be moved from the first to second and third positions by some combination of rotating the first plate 62 clockwise and the second plate 64 counterclockwise. Of course, the cells 72 are then moved back toward the first position by rotating the two plates 62, 64 in the opposite directions. It is understood that the plates 62, 64 can be rotated in any fashion as discussed above to move the cells 72 to any position between the first and third positions.

While the remaining drawings of various embodiments herein do not depict a singulator, it is understood that a singulator substantially the same or similar to the singulator 74 depicted in FIGS. 2A-2C is included in each of the seed meter embodiments disclosed or contemplated herein.

Another embodiment of an adjustable seed meter system 80 is depicted in FIGS. 3A-3M, in which the entire system 80 is shown. The seed meter system 80 has a housing 82, a first seed plate 84, a second seed plate 86 (as best shown in FIGS. 3F-3H and 3L), a plate adjustment drive system 88 (as best shown in FIGS. 3C-3L), and a meter drive system 90 (as best shown in FIGS. 3C-3L). The meter drive system 90 rotates the two plates 84, 86 together in relation to the housing 82 in the standard fashion to meter seed, while the plate adjustment drive system 88 rotates the two plates 84, 86 in relation to each other to adjust the seed cells as described herein (in a fashion similar to seed cells 72 as described above). As mentioned above, the system 80 also has singulator coupled thereto, but the singulator is not shown in these figures. Similarly, the remaining embodiments disclosed or contemplated herein also have singulators substantially similar to the singulator 74 as discussed above and shown in FIGS. 2A-2C, but the singulators are not depicted in the figures relating to those remaining embodiments.

Figure 3A:
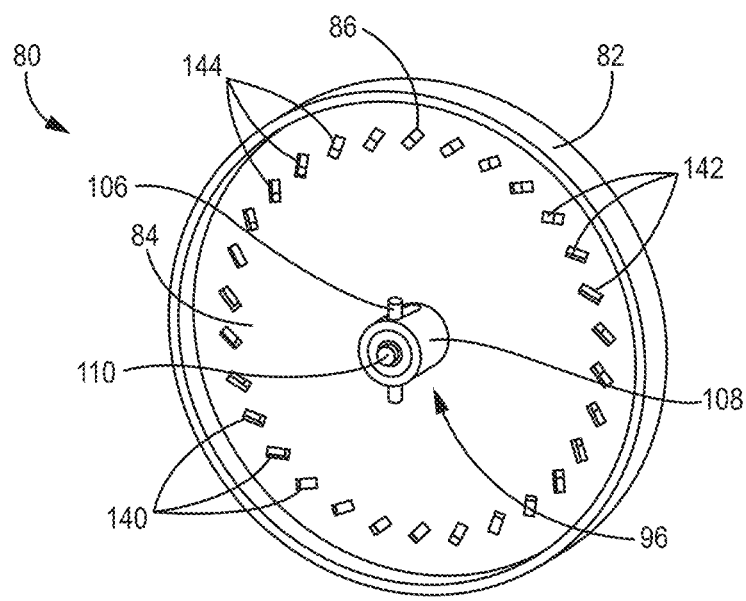
FIG. 3A is a perspective view of first and second seed plates in one position in a seed chamber, according to one embodiment.
Figure 3B:
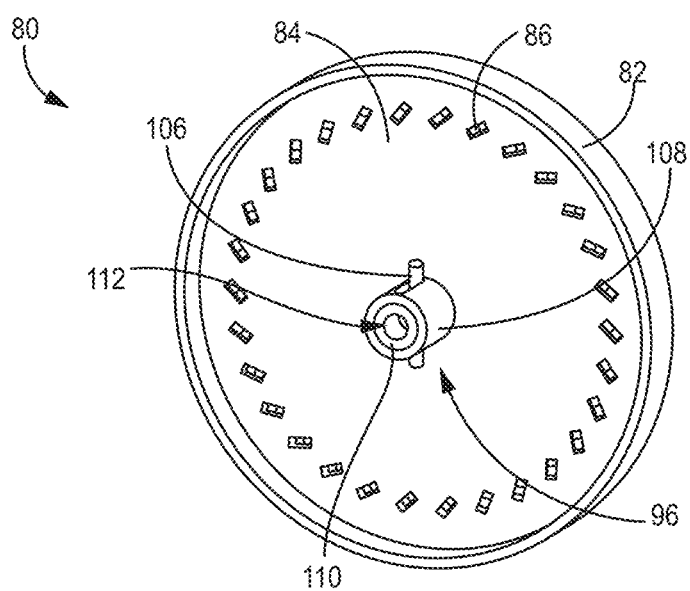
FIG. 3B is a perspective view of the first and second seed plates of FIG. 3A in a second position, according to one embodiment.
Figure 3C:
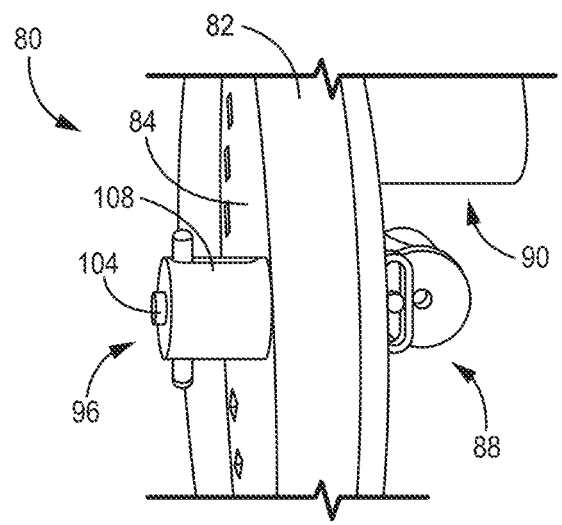
FIG. 3C is a side perspective view of the seed chamber of FIG. 3A with the plate adjustment drive system in a first position, according to one embodiment.
Figure 3F:
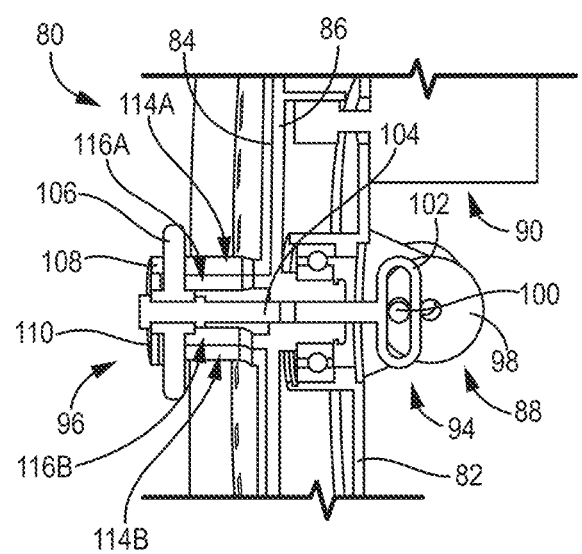
FIG. 3F is a cross-sectional side view of the seed chamber of FIG. 3C, according to one embodiment.
Figure 3D:
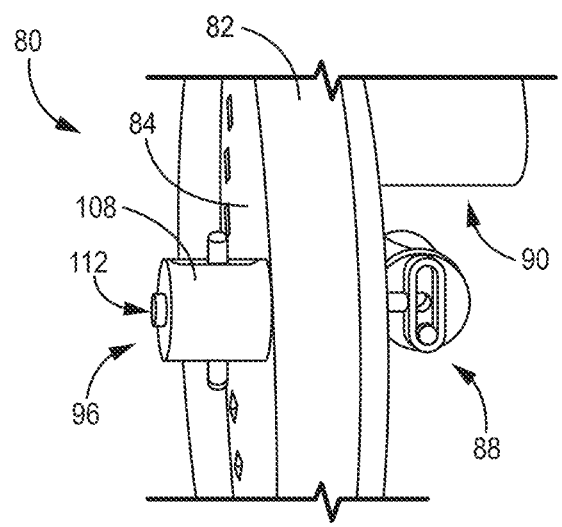
FIG. 3D is a side perspective view of the seed chamber of FIG. 3A with the plate adjustment drive system in a second position, according to one embodiment.
Figure 3G:
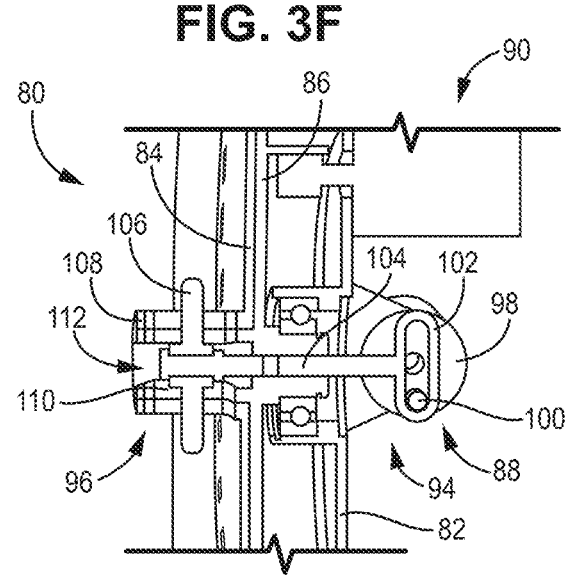
FIG. 3G is a cross-sectional side view of the seed chamber of FIG. 3D, according to one embodiment.
Figure 3E:
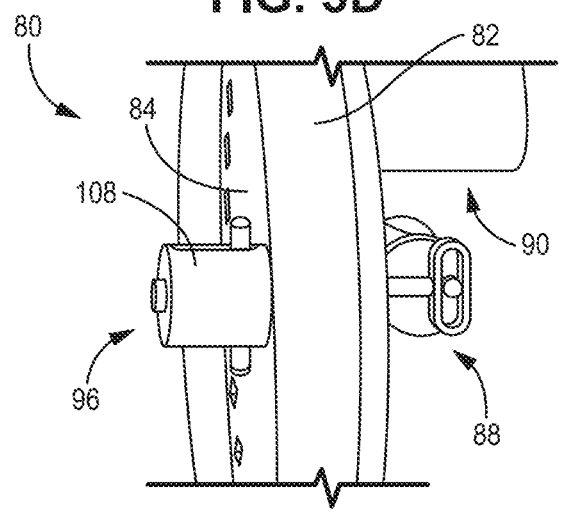
FIG. 3E is a side perspective view of the seed chamber of FIG. 3A with the plate adjustment drive system in a third position, according to one embodiment.
Figure 3H:
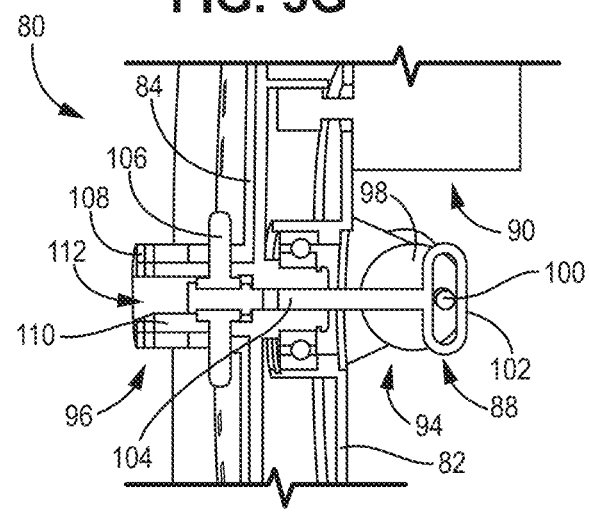
FIG. 3H is a cross-sectional side view of the seed chamber of FIG. 3E, according to one embodiment.
Figure 3I:
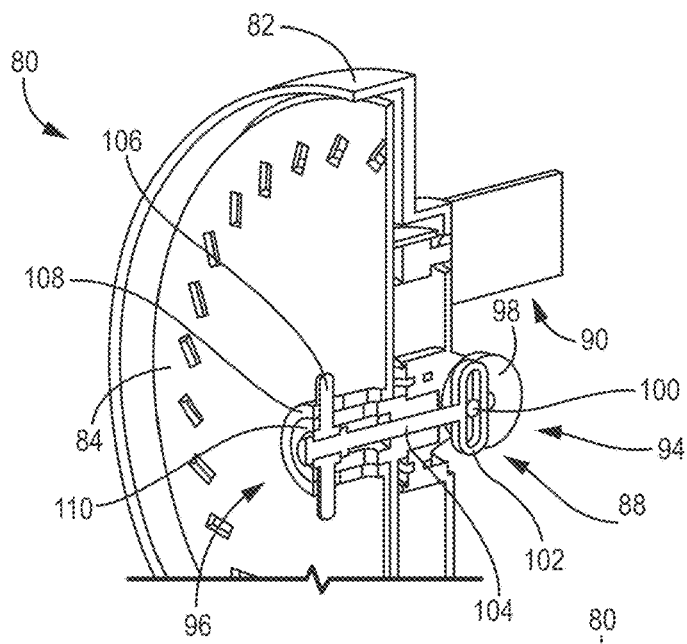
FIG. 3I is a cross-sectional perspective view of the seed chamber of FIG. 3C, according to one embodiment.
Figure 3J:
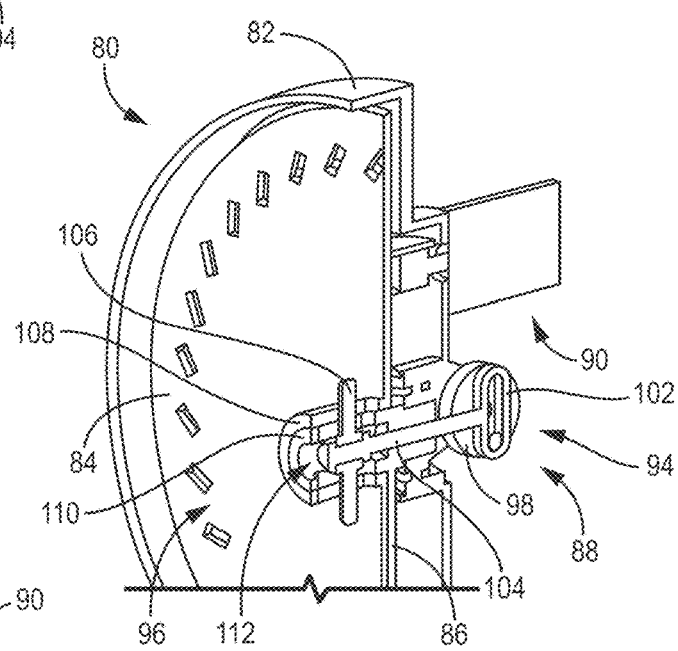
FIG. 3J is a cross-sectional perspective view of the seed chamber of FIG. 3D, according to one embodiment.
Figure 3K:
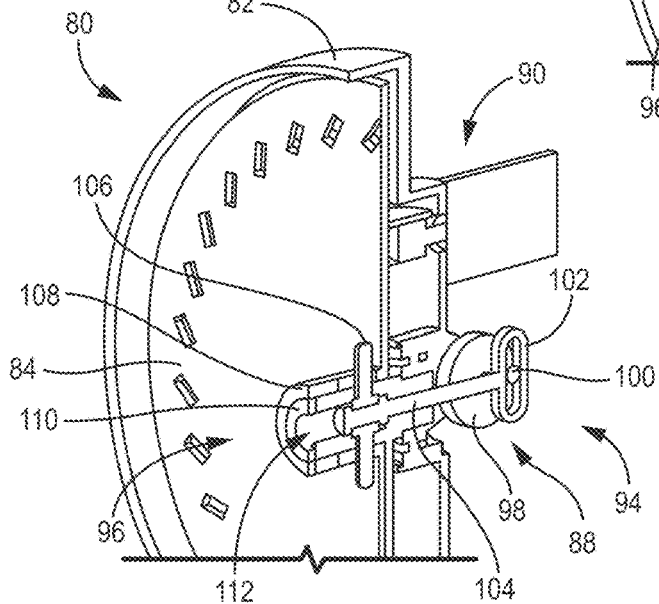
FIG. 3K is a cross-sectional perspective view of the seed chamber of FIG. 3E, according to one embodiment.
Figure 3L:
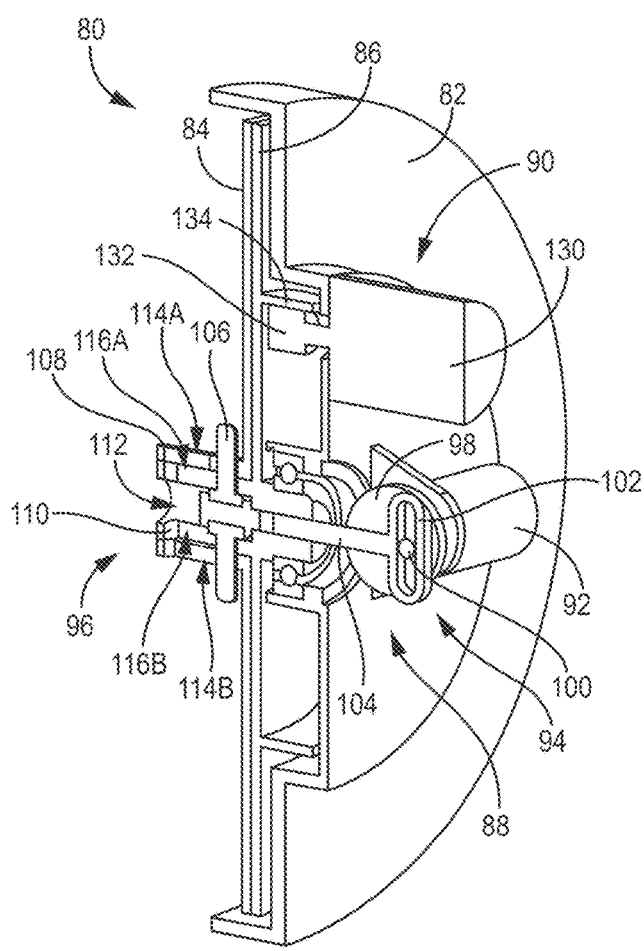
FIG. 3L is another cross-sectional perspective view of the seed chamber of FIG. 3E, according to one embodiment.

As best shown in FIG. 3L, the plate adjustment drive system 88 has a plate adjustment actuator 92, a force conversion mechanism 94 coupled to the actuator 92, and a plate rotation mechanism 96 coupled to the force conversion mechanism 94. In one embodiment, the force conversion mechanism 94 is a scotch yoke mechanism 94. Alternatively, the mechanism 94 can be any mechanism for converting the rotational force of the actuator 92 into translational force. The scotch yoke mechanism 94 has a crank (or drive wheel) 98 with a rotational pin (or protrusion) 100 coupled thereto. The pin 100 is slidably disposed in the yoke (or "slot") 102 at one end of the translational slider (or "elongate slidable component") 104. The slider 104 has a slidable pin 106 at the end opposite the yoke 102. In operation, the actuator 92 actuates the crank 98 to rotate, causing the pin 100 to rotate while positioned within the yoke 102, thereby resulting in the yoke 102 (and thus the slider) being urged translationally back and forth, thereby converting rotation into translation. Alternatively, the translational slider 104 can be actuated by any known combination of actuation components that can convert the rotational force of an actuator (such as actuator 92) into the translational force that urges the translational slider 104 back and forth.

The plate rotation mechanism 96 is coupled to the scotch yoke mechanism 94 via the slidable pin 106 on the slider 104. The plate rotation mechanism 96 is the mechanism that causes the two plates 84, 86 to rotate in relation to each other as a result of the interaction with the scotch yoke mechanism 94. As best shown in FIGS. 3F-3H, 3L, and 3M, the plate rotation mechanism 96 has an outer cylinder 108 that is coupled to or integral with the first plate 84 and an inner cylinder 110 that is rotatably disposed within the outer cylinder 108 and is coupled to or integral with the second plate 86. Further, the plate rotation mechanism 96 also has a lumen 112 defined by the inner cylinder 110 that receives the slider 104 such that the slider 104 is disposed within the lumen 112 and can move laterally therein. In addition, both the outer 108 and inner 110 cylinders have slots 114, 116 defined in the outer surfaces thereof that are disposed in relation to each other such that the slidable pin 106 is positionable within the slots 114, 116 and lateral movement of the slidable pin 106 within the slots 114, 116 causes the two cylinders 108, 110, and hence the two plates 84, 86, to rotate in relation to each other.

While the slots 114, 116 will be referred to generally as slots 114 defined in the outer cylinder 108 and slots 116 defined in the inner cylinder 110, more specifically, the outer cylinder 108 has two slots 114A, 114B and the inner cylinder 110 has two slots 116A, 116B. As best shown in FIG. 3L, the two slots 114A, 114B are disposed on opposite sides of the outer cylinder 108 and are aligned with each other such that the slidable pin 106 can be disposed through both slots 114A, 114B. Similarly, the two slots 116A, 116B are disposed on opposite sides of the inner cylinder 110 and are aligned with each other such that the slidable pin 106 can be disposed through both slots 116A, 116B.

Figure 3M:
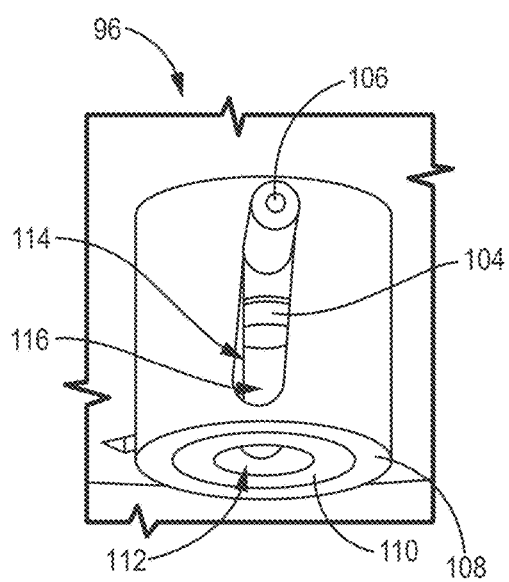
FIG. 3M is a top view of the seed chamber of FIG. 3E, according to one embodiment.

The outer cylinder slots 114 are offset in relation to the inner cylinder slots 116, or vice versa, such that the disposition of the slots 114, 116 in relation to each other provide for the rotation of the outer 108 and inner 110 cylinders as the pin 106 is urged laterally along the slots 114, 116. That is, in the specific embodiment as best shown in FIG. 3M, the outer cylinder slots 114 are disposed at an angle in relation to the longitudinal axis of the cylinder 108, while the inner cylinder slots 116 are parallel to the longitudinal axis of the cylinder 110. Alternatively, the inner cylinder slots 116 can be disposed at an angle while the outer cylinder slots 114 are parallel to the longitudinal axis. In a further embodiment, the two sets of slots 114, 116 can be disposed in any angular relations to the longitudinal axis of the inner lumen 112 so long as one set of slots 114, 116 is disposed at some angle in relation to the other set of slots 114, 116, thereby ensuring that the cylinders 108, 110 rotate in relation to each other when the pin 106 moves within the slots 114, 116, which ensures that the two plates 84, 86 rotate in relation to each other as a result.

As best shown in FIG. 3L, the meter drive system 90, as mentioned above, rotates the two plates 84, 86 together in relation to the housing 82 in the standard fashion to meter seed. According to various embodiments, the meter drive system 90 is operable independently of the plate adjustment drive system 88. The system 90 has a drive actuator (or "motor") 130, a drive gear 132, and a driven cylinder 134 mateably coupled to the driven gear 132. The driven cylinder 134 is coupled to (or integral with) the second plate 86. In one embodiment, the driven cylinder 134 has gears (not shown) along its inner surface that couple to gears (not shown) on the outer surface of the drive gear 132 such that rotation of the drive gear 132 causes rotation of the driven cylinder 134 around the central axis of the two plates 84, 86, which in this embodiment is the slider 104.

In certain implementations, it is understood that the system 80 can have any known actuation or drive components or features that can be used to adjust the seed plates 84, 86 as disclosed or contemplated herein and/or to rotate the two plates 84, 86 together to meter seed. For example, the actuators 92, 130 can be any known actuators, including any type of motors that are known to be used in seed meter systems and/or planting systems. Further, the mechanisms that couple the actuator 92 to the two plates 84, 86 and thereby causes the two plates 84, 86 to rotate in relation to each other can be any known mechanisms for converting rotational movement to lateral movement and then back to rotational movement. Alternatively, the mechanisms could be alternative known mechanisms that eliminate at least one of the movement conversions.

In operation, the adjustment of the seed meter system 80 by rotating the first plate 84 in relation to the second plate 86 (or vice versa) is actuated by activating the motor 92. The activation of the motor 92 causes rotation of the drive wheel 98, which causes rotation of the pin 100 around the rotational axis of the wheel 98, thereby causing lateral movement of the slider 104 within the lumen 112, which causes lateral movement of the pin 106. As best shown in FIG. 3M, as the pin 106 moves laterally along the longitudinal axis of the slider 104, the pin 106 moves along the length of the slots 114, 116 in the outer 108 and inner 110 cylinders. As a result of the outer slot 114 being angled in relation to the inner slot 116, the lateral movement of the pin 106 within the slots 114, 116 causes the two cylinders 108, 110 to rotate in relation to each other. Because the cylinders 108, 110 are attached to the first and second plates 84, 86, respectively, the rotation of the two cylinders 108, 110 in relation to each other causes the rotation of the two plates 84, 86 in relation to each other.

In the specific exemplary embodiment as best shown in FIG. 3A, the two plates 84, 86 have angled openings 140, 142 that form seed cells 144 in a fashion similar to the angled openings 70, 72 in the previous embodiment of FIGS. 2A-2C. As such, the two plates 84, 86 operate together with their angled openings 140, 142 to provide adjustable seed cells 144 that can be moved so as to adjust the radial position of the cells 144 on the plates 84, 86 in relation to the singulator (not shown), in a fashion similar to the prior embodiment of FIGS. 2A-2C. Alternatively, the system 80 can have any type of rotatable plates according to any of the various embodiments herein, thereby resulting in a system 80 that is an adjustable seed meter system 80 that provides for any adjustment parameter disclosed or contemplated herein. In other words, it is understood that any of the various plate embodiments disclosed or contemplated herein, including those embodiments set forth in additional detail elsewhere herein, can be incorporated into the system 80 or any similar system.

Figure 4A:
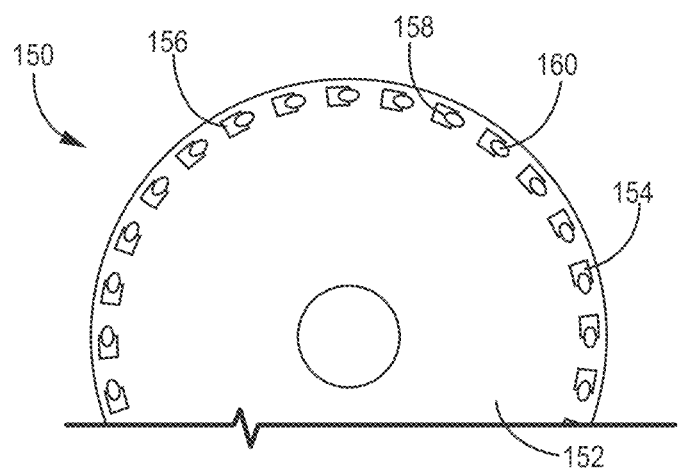
FIG. 4A is a side view of first and second seed plates in a first position, according to one embodiment.
Figure 4B:
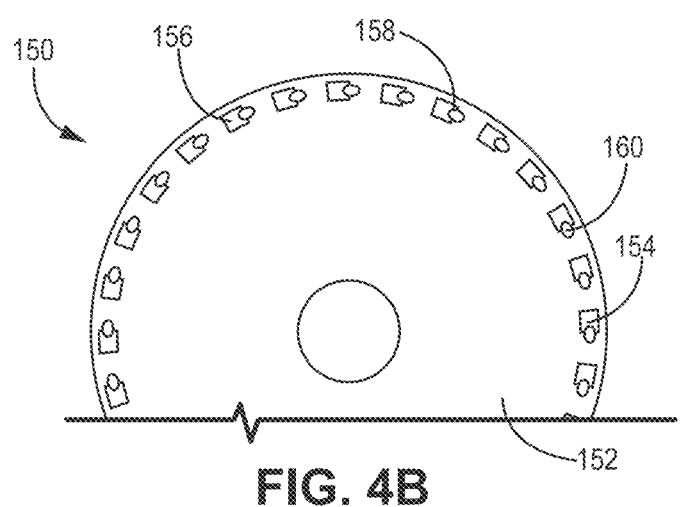
FIG. 4B is a side view of the first and second seed plates of FIG. 4A in a second position, according to one embodiment.
Figure 4C:
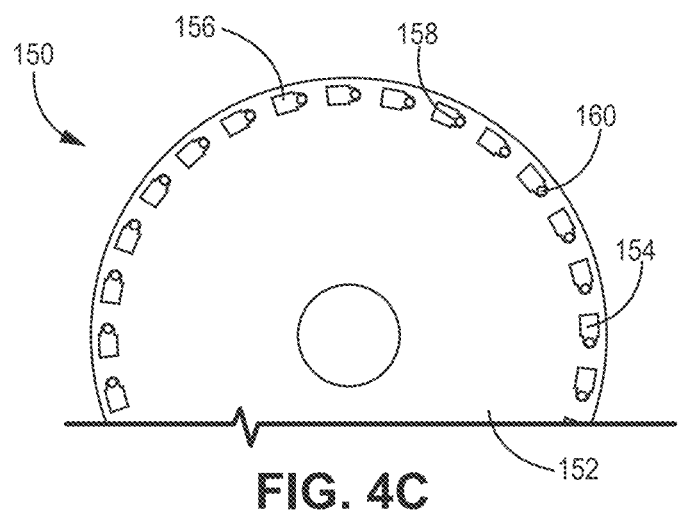
FIG. 4C is a side view of the first and second seed plates of FIG. 4A in a third position, according to one embodiment.

Another exemplary adjustable seed meter system embodiment 150 is shown in FIGS. 4A-4C. In a fashion similar to FIGS. 2A-2C, FIGS. 4A-4C depict solely the two seed plates 152, 154 of the system 150 to best explain the rotational relationship between the two plates 152, 154 and the types of adjustable cells provided therein. In this implementation, the two seed plates 152, 154 operate together as described below to provide an adjustable cell size (in contrast to adjustable position as described above with respect to plates 62, 64). It is understood that the two plates 152, 154 can be incorporated into the adjustable seed meter system 80 described in detail above or any similar system as contemplated herein. Except as set forth herein, the two plates 152, 154 and the related components and features are identical or substantially similar to the two plates 62, 64 in the embodiment discussed above in relation to FIGS. 2A-2C. Each plate 152, 154 has a set of corresponding openings defined around an outer radial portion of the plates 152, 154. The plate 152 has a set of openings 156 having a specific, predetermined shape as shown and the plate 154 has a set of openings 158 that are substantially oval in shape and align with the openings 156 of the plate 152, such that each of the corresponding openings 156, 158 form an adjustable cell 160 in which the size of the cell 160 is adjustable as shown. More specifically, the two openings 156, 158 have predetermined, specific shapes, resulting in cells 160 that are geometrically adjustable such that the size and shape of the cells 160 can be adjusted by rotating the two plates 152, 154 in relation to each other.

In operation, the two plates 152, 154 can be rotated in relation to each other to adjust the size and shape of the cells 160, thereby increasing the strength of the attachment of the seed to the cells 160 (by increasing the size of the cells 160 and thereby increasing the amount of vacuum applied at each cell 160) or improving the ability of each cell 160 to receive and maintain attachment to a specifically (or differently) shaped or sized seed. That is, the cells 160 can be adjusted to change the amount of vacuum or to change the size of seed that can be retained therein. For example, in FIG. 4A, the plates 152, 154 are positioned such that the cells 160 form a first size/shape (also referred to as the "large" or "oval" shape) in which the cells 160 are relatively larger than any other cell size/shape and thus provide the greatest vacuum strength and/or are shaped to receive the largest seeds. Further, in FIG. 4B, one or both plates 152, 154 are rotated in relation to each other such that the cells 160 form a second size/shape (also referred to as the "midsized" or "small oval" shape) in which the cells 160 have a cell size/shape that is smaller than the first size/shape. Finally, in FIG. 4C, one or both plates 152, 154 are rotated in relation to each other such that the cells 160 form a third size/shape (also referred to as the "small" or "round" shape) in which the cells 160 have a cell size/shape that is smaller than the second size/shape. It is understood that the plates 152, 154 can be rotated in any fashion as discussed above to move the cells 160 to any position between the first and third sizes/shapes.

Figure 5A:
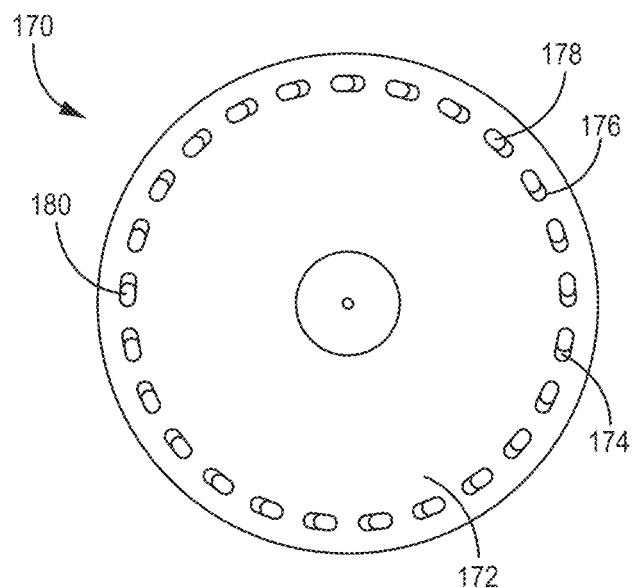
FIG. 5A is a side view of first and second seed plates in a first position, according to one embodiment.
Figure 5B:
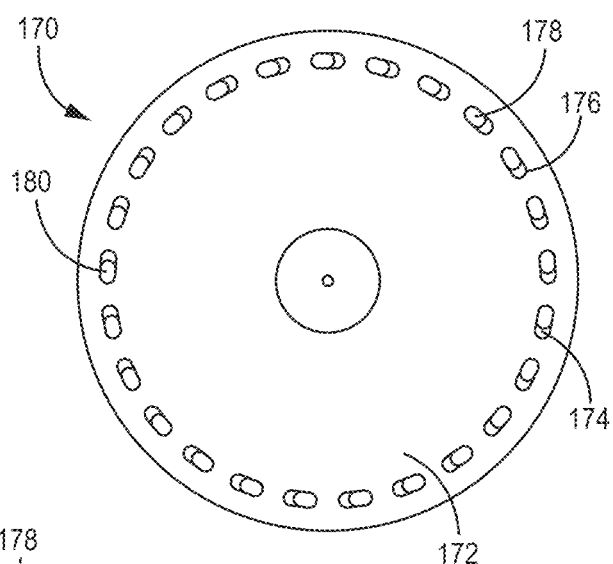
FIG. 5B is a side view of the first and second seed plates of FIG. 5A in a second position, according to one embodiment.
Figure 5C:
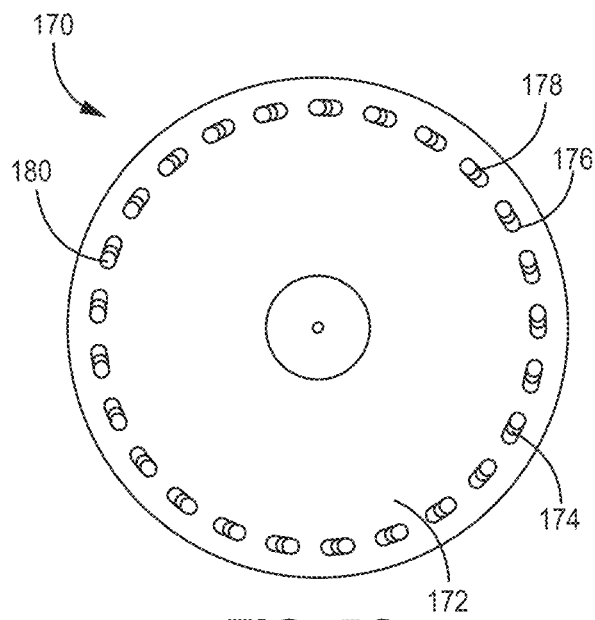
FIG. 5C is a side view of the first and second seed plates of FIG. 5A in a third position, according to one embodiment.

A further implementation of an adjustable seed meter system embodiment 170 is shown in FIGS. 5A-5C. In a fashion similar to FIGS. 2A-2C and 4A-4C, FIGS. 5A-5C depict solely the two seed plates 172, 174 of the system 170 to best explain the rotational relationship between the two plates 172, 174 and the types of adjustable cells provided therein. It is understood that the two plates 172, 174 can be incorporated into the adjustable seed meter system 80 described in detail above or any similar system as contemplated herein. Except as set forth herein, the two plates 172, 174 and the related components and features are identical or substantially similar to the two plates 62, 64 and/or the two plates 152, 154 in the embodiments discussed above in relation to FIGS. 2A-2C and 4A-4C. Each plate 172, 174 has a set of corresponding openings defined around an outer radial portion of the plates 172, 174. The plate 172 has a set of openings 176 having a substantially oval shape as shown and the plate 174 has a set of openings 178 that are substantially oval in shape and align with the openings 176 of the plate 172, such that each of the corresponding openings 176, 178 form an adjustable cell 180 as shown. More specifically, the two openings 176, 178 have predetermined, specific oval shapes resulting in cells 180 that are adjustable such that the size of the oval-shaped cells 180 can be adjusted by rotating the two plates 172, 174 in relation to each other.

In operation, the two plates 172, 174 can be rotated in relation to each other to adjust the size of the cells 180, thereby increasing the strength of the attachment of the seed to the cells 180 (by increasing the size of the cells 180 and thereby increasing the amount of vacuum applied at each cell 180) or improving the ability of each cell 180 to receive and maintain attachment to a specifically (or differently) shaped or sized seed. That is, the cells 180 can be adjusted to change the amount of vacuum or to change the size of seed that can be retained therein. For example, in FIG. 5A, the plates 172, 174 are positioned such that the cells 180 form a first size (also referred to as the "large" size) in which the oval cells 180 are relatively larger than any other cell size and thus provide the greatest vacuum strength and/or are sized to receive the largest seeds. Further, in FIG. 5B, one or both plates 172, 174 are rotated in relation to each other such that the oval cells 180 form a second size (also referred to as the "midsized" oval size) in which the oval cells 180 have a cell size that is smaller than the first size. Finally, in FIG. 5C, one or both plates 172, 174 are rotated in relation to each other such that the oval cells 180 form a third size (also referred to as the "small" size) in which the cells 180 have a cell size that is smaller than the second size. It is understood that the plates 172, 174 can be rotated in any fashion as discussed above to move the cells 180 to any position between the first and third sizes.

Figure 6A:
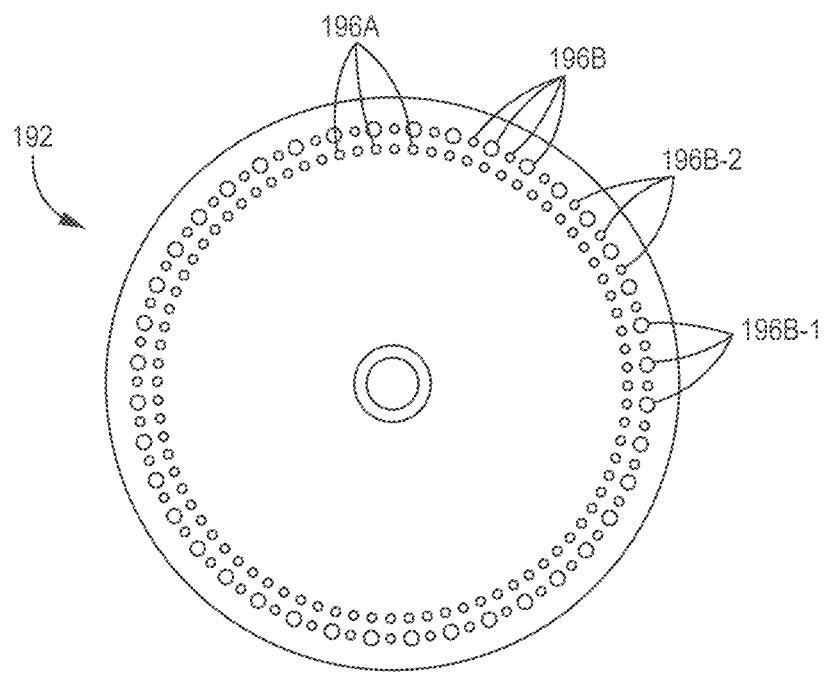
FIG. 6A is a side view of a first seed plate, according to another embodiment.
Figure 6B:
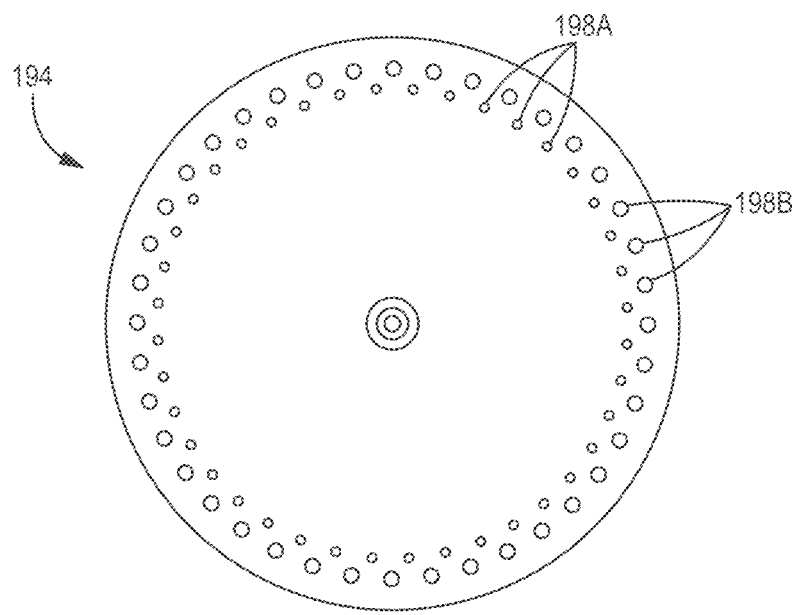
FIG. 6B is a side view of a second seed plate, according to another embodiment.
Figure 6C:
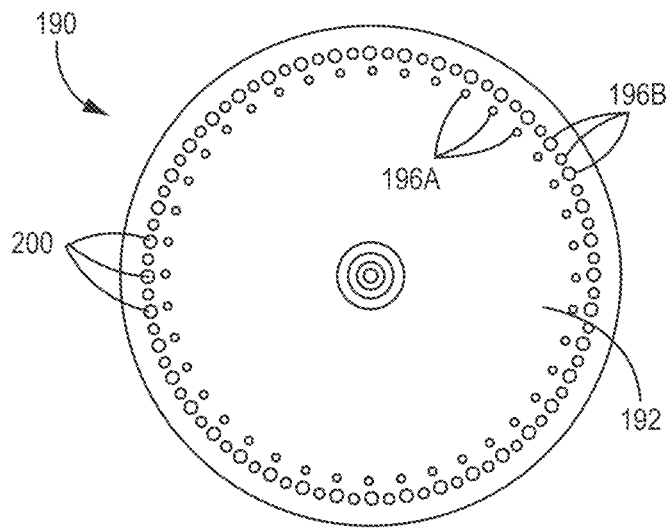
FIG. 6C is a side view of the first and second seed plates of FIGS. 6A and 6B in a first position, according to one embodiment.
Figure 6D:
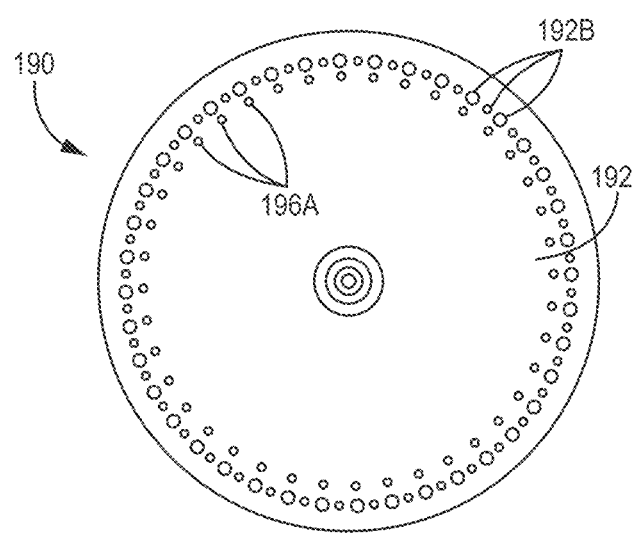
FIG. 6D is a side view of the first and second seed plates of FIG. 6C in a second position, according to one embodiment.
Figure 6E:
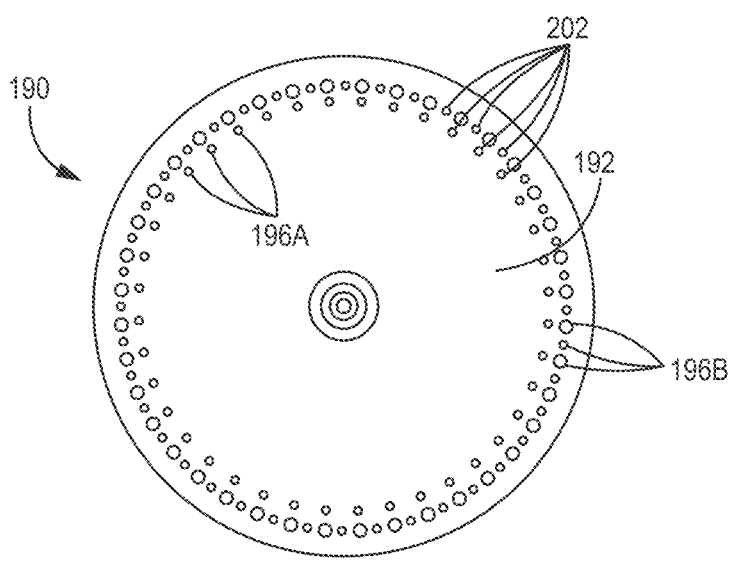
FIG. 6E is a side view of the first and second seed plates of FIG. 6C in a third position, according to one embodiment.

Yet another embodiment of an adjustable seed meter system 190 is shown in FIGS. 6A-6E. More specifically, FIGS. 6A and 6B depict each of the two plates 192, 194 separately, while FIGS. 6C-6E depict both plates 192, 194 positioned adjacent to each other as during use of the plates 192, 194 during operation thereof. As such, as shown in FIGS. 6C-6E, the seed plate 192 is positioned "in front" of seed plate 194 for purposes of the figures such that seed plate 192 is readily visible while seed plate 194 is only visible through the various openings of plate 192. In a fashion similar to FIGS. 2A-2C, 4A-4C, and 5A-5C, FIGS. 6A-6E depict solely the two seed plates 192, 194 of the system 190 to best explain the rotational relationship between the two plates 192, 194 and the types of adjustable cells provided therein. It is understood that the two plates 192, 194 can be incorporated into the adjustable seed meter system 80 described in detail above or any similar system as contemplated herein. Except as set forth herein, the two plates 192, 194 and the related components and features are identical or substantially similar to the two plates 62, 64, the two plates 152, 154, and/or the two plates 172, 174 in the embodiments discussed above in relation to FIGS. 2A-2C, 4A-4C, and 5A-5C. Each plate 192, 194 has a set of corresponding openings defined around an outer radial portion of the plates 192, 194. More specifically, in this specific implementation, each plate 192, 194 has two rows of corresponding openings as shown. As best shown in FIG. 6A, which depicts solely plate 192, the plate 192 has a first, inner row of openings 196A of uniform size and a second, outer row of openings 196B in which half the openings 196B-1 are first openings 196B-1 having a first diameter (such that they are larger than the inner row of openings 196A) (also referred to as "large openings") and half the openings 196B-2 are second openings 196B-2 having a second diameter (that are identical in size or substantially the same size as the inner row of openings 196A and thus are smaller than the first openings 196B-1) (also referred to as "small openings"), wherein the openings in both rows have a substantially round shape as shown. Similarly, as best shown in FIG. 6B, which depicts solely plate 194, the plate 194 has a first, inner row of openings 198A and a second, outer row of openings 198B that can be generally the same size as the outer row of large openings 196B-1 (or can be bigger), wherein the openings in both rows have a substantially round shape as shown.

Further, as will be discussed in detail below and as depicted in FIGS. 6C-6E (with reference to FIGS. 6A and 6B as well), both rows of openings 196A, 196B of the first plate 192 align with the two rows of openings 198A, 198B of the second plate 194 (as best shown in FIG. 6B), such that the positioning of the corresponding rows of openings 196A, 196B, 198A, 198B via the relative rotation of the two plates 192, 194 result in a different number of cells 200, 202 of different sizes as shown in FIGS. 6C-6E. More specifically, as described in additional detail below, the two rows of openings 196A, 196B in the first plate 192 and the two rows of openings 198A, 198B in the second plate 194 (as best shown in FIG. 6B) are positioned on their respective plates 192, 194 such that a different number and configuration of openings 196A, 196B, 198A, 198B align in the first and second rotational positions of the plates 192, 194, thereby providing for adjustment of the number of seed cells 200, 202 and the size thereof as a result of relative rotation of the plates 192, 194.

In operation as best shown in FIGS. 6C-6E, the two plates 192, 194 can be rotated in relation to each other to adjust the number and size of the seed cells 200, 202, thereby increasing the number of smaller seeds being delivered via the seed meter 190 by providing a greater number of small cells 202 as shown in FIG. 6E or providing for a comparatively smaller number of larger seeds being delivered (that is less than the number of smaller seeds delivered in FIG. 6E) by providing a smaller number of large cells 200 as shown in FIG. 6C. For example, in one specific exemplary embodiment, the two plates 192, 194 can rotate between the two settings depicted and described herein: a first (or soybean) setting as shown in FIG. 6E having an increased number of small cells 202 that are appropriate for soybean seeds, and a second (or corn) setting as shown in FIG. 6C having a smaller number of large cells 200 that are appropriate for corn seeds. FIG. 6D depicts the transition of the plates between the first and second settings. Alternatively, any combination of number of cells and size of those cells can be provided based on the configuration of the openings in the two plates 192, 194. In this example, in FIG. 6C, the plates 192, 194 are positioned such that the large openings 196B-1 in the outer row of openings 196B of the first plate 192 aligns with certain of the outer row of openings 198B of the second plate 194 to produce a single row of large cells 200 in the first position. The plates 192, 194 can then be rotated relative to each other into the second position as best shown in FIG. 6E, in which the small openings 196B-2 in the outer row of openings 196B of the first plate 192 aligns with certain of the outer row of openings 198B of the second plate 194 and the inner row of openings 196A of the first plate 192 aligns with the inner row of openings 198A of the second plate 194 to produce two rows of small cells 202 as shown. It is understood that the plates 192, 194 can be rotated in any fashion as discussed above to move the cells 200, 202 to any position between the first and second positions.

Figure 7A:
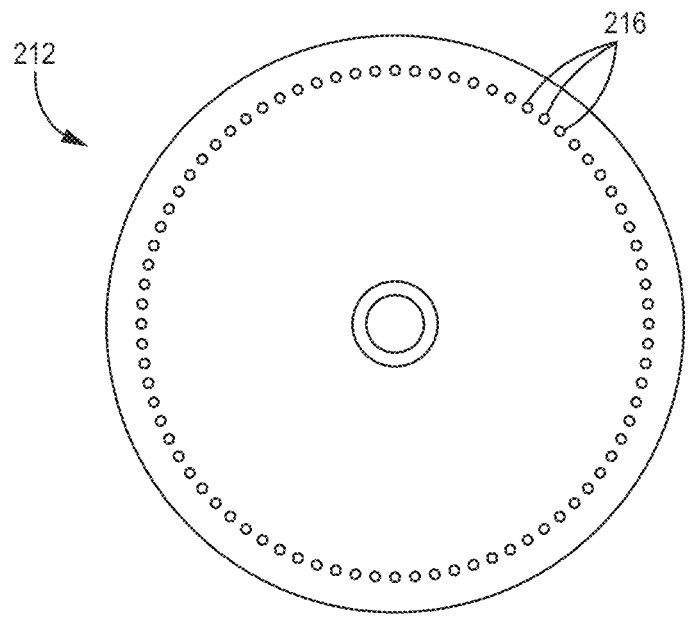
FIG. 7A is a side view of a first seed plate, according to another embodiment.
Figure 7B:
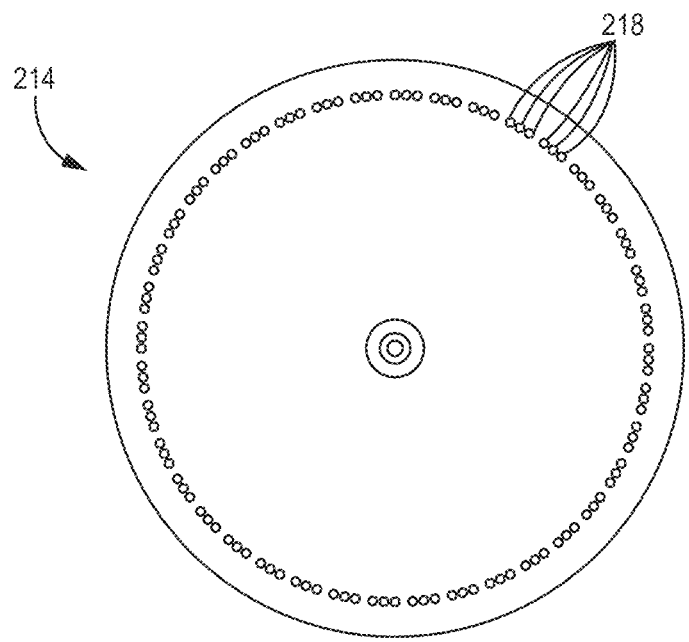
FIG. 7B is a side view of a second seed plate, according to another embodiment.

Another adjustable seed meter system 210 according to yet another implementation is shown in FIGS. 7A-7E. In a fashion similar to FIGS. 2A-2C, 4A-4C, 5A-5C, and 6A-6E, FIGS. 7A-7E depict solely the two seed plates 212, 214 of the system 210 to best explain the rotational relationship between the two plates 212, 214 and the types of adjustable cells provided therein. It is understood that the two plates 212, 214 can be incorporated into the adjustable seed meter system 80 described in detail above or any similar system as contemplated herein. Except as set forth herein, the two plates 212, 214 and the related components and features are identical or substantially similar to the two plates 62, 64, the two plates 152, 154, the two plates 172, 174, and/or the two plates 192, 194 in the embodiments discussed above in relation to FIGS. 2A-2C, 4A-4C, 5A-5C, and 6A-6E. Each plate 212, 214 has a set of corresponding openings defined around an outer radial portion of the plates 212, 214. More specifically, in this specific implementation, each plate 212, 214 has a single row of corresponding openings as shown. As best shown in FIG. 7A, which depicts solely plate 212, the plate 212 has a row of openings 216 of substantially uniform size, wherein the openings 216 have a substantially round shape as shown. Similarly, as best shown in FIG. 7B, which depicts solely plate 214, the plate 214 has a corresponding row of openings 218 that have a substantially round shape as shown. Further, as will be discussed in detail below and depicted in FIGS. 7C-7E, the row of openings 216 of the first plate 212 aligns with the row of openings 218 of the second plate 214, such that the positioning of the rows of openings 216, 218 via the relative rotation of the two plates 212, 214 result in a different number of cells 220, 222 as shown. More specifically, as described in additional detail below, the openings in the row of openings 216 in the first plate 212 and the openings in the row of openings 218 in the second plate 214 are positioned on their respective plates 212, 214 such that a different number of openings 216, 218 align in the first and second rotational positions of the plates 212, 214, thereby providing for adjustment of the number of seed cells 220, 222 as a result of relative rotation of the plates 212, 214. That is, based on the configuration of the openings 216, 218, the first position in FIG. 7C has a number of cells 220 that is half as many as the number of cells 222 in the second position in FIG. 7E.

Figure 7C:
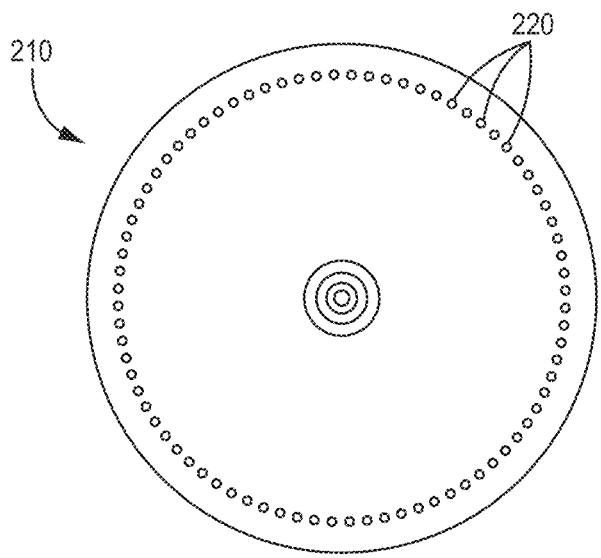
FIG. 7C is a side view of the first and second seed plates of FIGS. 7A and 7B in a first position, according to one embodiment.
Figure 7D:
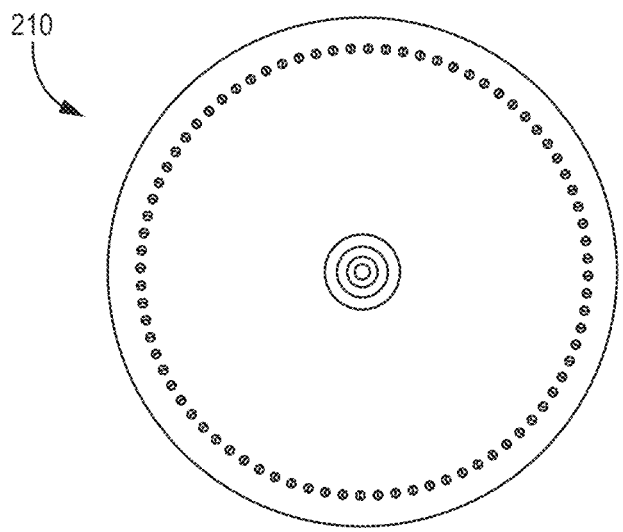
FIG. 7D is a side view of the first and second seed plates of FIG. 7C in a second position, according to one embodiment.
Figure 7E:
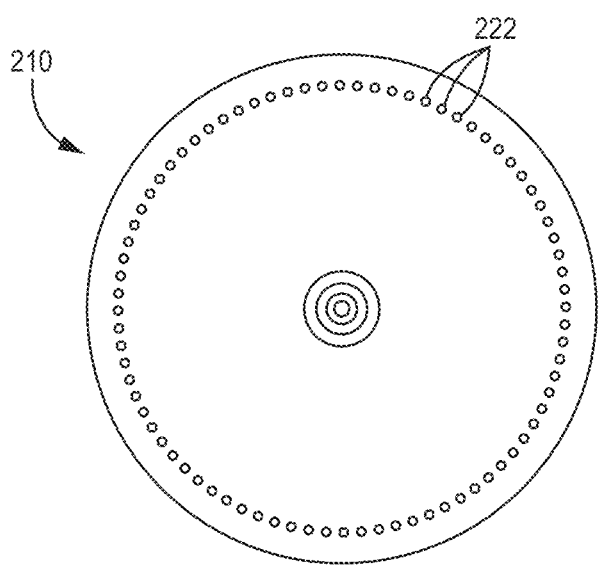
FIG. 7E is a side view of the first and second seed plates of FIG. 7C in a third position, according to one embodiment.

In operation as best shown in FIGS. 7C-7E, the two plates 212, 214 can be rotated in relation to each other to adjust the number of the seed cells 220, 222, thereby increasing the number of seeds being delivered via the seed meter 210 by providing an increased number of cells 222 as shown in FIG. 7E or decreasing the number of seeds being delivered via the seed meter 210 by providing a decreased number of cells 220 as shown in FIG. 7C. FIG. 7D depicts the transition of the plates between the first and second settings. Alternatively, any combination of number of cells and size of those cells can be provided based on the configuration of the openings in the two plates 212, 214. In this example, in FIG. 7C, the plates 212, 214 are positioned such that half of the openings in the row of openings 216 of the first plate 212 aligns with certain of the openings in the row of openings 218 of the second plate 214 to produce a predetermined number of cells 220 in the first position that is half of the total number of openings in the first plate 212. The plates 212, 214 can then be rotated relative to each other into the second position as best shown in FIG. 7E, in which all of the openings 216 in the row of openings 216 of the first plate 212 align with the openings 218 in the row of openings 218 of the second plate 214 to produce a predetermined number of cells 222 in the second position that is equal to the number of openings 216 in the first plate 212 as shown. It is understood that the plates 212, 214 can be rotated in any fashion as discussed above to move the cells 220 to any position between the first and second positions.

Although the present invention has been described with reference to preferred embodiments, persons skilled in the art will recognize that changes may be made in form and detail without departing from the spirit and scope of the invention.

What is claimed is:

1. An automatically adjustable seed metering system, the system comprising:
   (a) a first seed disk comprising first openings defined in the first seed disk;
   (b) a second seed disk adjacent to and rotatable in relation to the first seed disk, the second seed disk comprising second openings defined in the second seed disk adjacent to the first openings, wherein the second openings are rotatably and adjustably alignable with the first openings, wherein a rotational axis of the second seed disk is concentric with a rotational axis of the first seed disk; and
   (c) a disk adjustment drive system comprising:
      (i) a first cylinder operably coupled to the first seed disk;
      (ii) a second cylinder rotatably disposed within the first cylinder and operably coupled to the second seed disk; and
      (iii) a translational elongate structure slidable along an axis parallel with the rotational axes of the first and second seed disks, wherein the translational elongate structure is operably coupled to the first and second cylinders such that translational movement of the translational elongate structure causes rotation of the first and second cylinders.

2. The seed metering system of claim 1,
   wherein each of the first openings is a slot disposed at an angle in relation to a radius of the first seed disk, and
   wherein each of the second openings is smaller than each of the first openings and is in fluidic communication with one of the first openings, whereby each pair of first and second openings defines an adjustable seed cell.

3. The seed metering system of claim 1,
   wherein each of the first openings is an elongate opening having a first end having a curved configuration and a second end that is wider than the first end such that the elongate opening increases in width along a length from the first end to the second end, and wherein each of the second openings is smaller than each of the first openings and is in fluidic communication with one of the first openings, wherein each of the second openings has a curved end opposing the curved first end, whereby each pair of first and second openings defines an adjustable ovular seed cell.

4. The seed metering system of claim 1, wherein the first openings comprise a first row of first openings and a second row of first openings, wherein the second openings comprise a first row of second openings adjacent to the first row of first openings and a second row of second openings adjacent to the second row of first openings, whereby the first row of first openings and the first row of second openings define a first row of adjustable seed cells and the second row of first openings and the second row of second openings define a second row of adjustable seed cells.

5. The seed metering system of claim 4, wherein the first row of first openings is an inner row of first openings, the second row of first openings is an outer row of first openings, the first row of second openings is an inner row of second openings, and the second row of second openings is an outer row of second openings.

6. The seed metering system of claim 5, wherein the second row of first openings comprise first openings of different diameters.

7. The seed metering system of claim 6, wherein the second row of first openings comprises a first set of second openings of a first diameter and a second set of second openings of a second diameter, wherein the first diameter is larger than the second diameter.

8. The seed metering system of claim 1, further comprising a meter drive system operably coupled to at least one of the first and second seed disks.

9. An automatically adjustable seed metering system, the system comprising:
(a) a metering housing;
(b) a first seed disk rotatably disposed within the metering housing, the first seed disk comprising at least one first disk curved row of first disk openings defined in the first seed disk;
(c) a second seed disk rotatably disposed within the metering housing adjacent to and rotatable in relation to the first seed disk, the second seed disk comprising at least one second disk curved row of second disk openings defined in the second seed disk adjacent to one of the at least one first disk curved rows, wherein the second disk openings are rotatably and adjustably alignable with the first disk openings, wherein a rotational axis of the second seed disk is concentric with a rotational axis of the first seed disk;
(d) a seed chamber defined between a first wall of the metering housing and the first seed disk; and
(e) a disk adjustment drive system operably coupled to the first and second seed disks, the disk adjustment drive system comprising:
(a) a first cylinder operably coupled to the first seed disk;
(b) a second cylinder rotatably disposed within the first cylinder and operably coupled to the second seed disk; and
(c) a translational elongate structure slidable along an axis parallel with the rotational axes of the first and second seed disks, wherein the translational elongate structure is operably coupled to the first and second cylinders such that translational movement of the translational elongate structure causes rotation of the first and second cylinders.

10. The seed metering system of claim 9, wherein the translational elongate structure is slidably disposed within the second cylinder.

11. The seed metering system of claim 10, wherein the first cylinder comprises at least one first slot defined within the first cylinder and the second cylinder comprises at least one second slot defined within the second cylinder, wherein the at least one second slot is disposed at an angle in relation to the at least one first slot.

12. The seed metering system of claim 11, wherein the translational elongate structure comprises a transverse pin operably coupled to the translational elongate structure, wherein the transverse pin is slidably disposed through the at least one first slot and the at least one second slot.

13. The seed metering system of claim 9, wherein the translational elongate structure is operably coupled to an actuator.

14. The seed metering system of claim 13, further comprising a drive wheel coupled to the translational elongate structure via a rotational pin attached to the drive wheel, wherein the rotational pin is slidably disposed within a slot defined in the translational elongate structure.

15. A method of automatically adjusting a seed meter during operation of a planting system, the method comprising:
rotating a first seed disk and a second seed disk at the same speed;
automatically rotating the first seed disk in relation to the second seed disk without manual adjustment, wherein:
(a) the first seed disk comprises at least one curved row of a plurality of first disk openings defined in the first seed disk;
(b) the second seed disk comprises at least one curved row of a plurality of second disk openings defined in the second seed disk adjacent to one of the at least one first disk curved rows,
wherein the plurality of second disk openings are rotatably and adjustably alignable with the plurality of first disk openings to form a plurality of seed cells,
wherein a plate adjustment drive system is operably coupled to the first and second seed disks, the plate adjustment drive system comprising:
(i) a first cylinder operably coupled to the first seed plate;
(ii) a second cylinder rotatably disposed within the first cylinder and operably coupled to the second seed plate; and
(iii) a translational elongate structure slidable along an axis parallel with the rotational axes of the first and second seed disks, wherein the translational elongate structure is operably coupled to the first and second cylinders such that translational movement of the translational elongate structure causes rotation of the first and second cylinders.

16. The method of claim 15, wherein the automatically rotating the first seed disk in relation to the second seed disk comprises actuating the plate adjustment drive system operably coupled to the first and second seed plates.

17. The method of claim 16, wherein the rotating the first seed disk and the second seed disk at the same speed comprises actuating a meter drive system operably coupled to at least one of the first and second seed plates.

\* \* \* \* \*